US012020883B2

(12) United States Patent
Topčagić et al.

(10) Patent No.: US 12,020,883 B2
(45) Date of Patent: Jun. 25, 2024

(54) SURGE PROTECTIVE DEVICE INCLUDING BIMETALLIC FUSE ELEMENT

(71) Applicant: RIPD IP DEVELOPMENT LTD., Nicosia (CY)

(72) Inventors: Zumret Topčagić, Ljubljana (SI); Robert Rozman, Smlednik (SI); Andrej Mesarič, Kranj (SI); Blaž Rozman, Jesenice (SI)

(73) Assignee: RIPD IP DEVELOPMENT LTD., Nicosia (CY)

( * ) Notice: Subject to any disclaimer, the term of this patent is extended or adjusted under 35 U.S.C. 154(b) by 0 days.

(21) Appl. No.: 17/519,993

(22) Filed: Nov. 5, 2021

(65) Prior Publication Data

US 2022/0148839 A1     May 12, 2022

Related U.S. Application Data

(60) Provisional application No. 63/111,195, filed on Nov. 9, 2020.

(51) Int. Cl.
| | | |
|---|---|---|
| *H01H 85/38* | (2006.01) | |
| *H01H 85/06* | (2006.01) | |
| *H01H 85/46* | (2006.01) | |
| *H02H 3/08* | (2006.01) | |
| *H01H 85/055* | (2006.01) | |

(52) U.S. Cl.
CPC ............ *H01H 85/38* (2013.01); *H01H 85/06* (2013.01); *H01H 85/46* (2013.01); *H02H 3/08* (2013.01); *H01H 2085/0555* (2013.01)

(58) Field of Classification Search
CPC ........ H01H 85/38; H01H 85/06; H01H 85/46; H01H 2085/0555; H02H 3/08
See application file for complete search history.

(56) References Cited

U.S. PATENT DOCUMENTS

| | | | |
|---|---|---|---|
| 2,326,074 A | 8/1943 | Joseph | |
| 3,267,240 A | 8/1966 | Fitzgerald | |
| 3,810,063 A * | 5/1974 | Blewitt ................. | H01H 85/47 337/159 |
| 4,168,514 A * | 9/1979 | Howell ................... | H01C 7/12 337/28 |

(Continued)

FOREIGN PATENT DOCUMENTS

| | | |
|---|---|---|
| CZ | 12200 U1 | 6/2002 |
| DE | 3049094 A1 | 7/1982 |

(Continued)

OTHER PUBLICATIONS

Translation of Seo, KR 101141915 B1. (Year: 2012).*

(Continued)

*Primary Examiner* — Jacob R Crum
(74) *Attorney, Agent, or Firm* — Myers Bigel, P.A.

(57) ABSTRACT

An electrical fuse assembly includes electrically conductive first and second electrodes, and a bimetallic fuse element. The bimetallic fuse element electrically connects the first and second electrodes. The bimetallic fuse element is configured to disintegrate, and thereby disconnect the first electrode from the second electrode, in response to a current exceeding a prescribed trigger current of the bimetallic fuse element for at least a prescribed duration.

28 Claims, 27 Drawing Sheets

(56) References Cited

U.S. PATENT DOCUMENTS

| | | | |
|---|---|---|---|
| 4,491,893 A | 1/1985 | Toshiharu | |
| 5,493,469 A | 2/1996 | Lace | |
| 5,933,310 A * | 8/1999 | Eggendorfer | H02H 9/042 337/76 |
| 7,053,536 B1 | 5/2006 | Boman et al. | |
| 7,570,473 B2 | 8/2009 | Adachi et al. | |
| 7,604,754 B2 | 10/2009 | Summers | |
| 7,643,265 B2 | 1/2010 | Loader et al. | |
| 7,660,095 B2 | 2/2010 | Shato et al. | |
| 7,719,815 B2 | 5/2010 | Shato et al. | |
| 7,937,825 B2 | 5/2011 | Shato et al. | |
| 8,743,525 B2 | 6/2014 | Xepapas et al. | |
| 10,186,842 B2 | 1/2019 | Rozman | |
| 10,319,545 B2 | 6/2019 | Kamensek et al. | |
| 10,340,110 B2 | 7/2019 | Vrhunc et al. | |
| 10,679,814 B2 | 6/2020 | Vrhunc et al. | |
| 10,685,767 B2 | 6/2020 | Kamensek et al. | |
| 10,685,805 B2 | 6/2020 | Rozman | |
| 10,734,176 B2 | 8/2020 | Kamensek et al. | |
| 2001/0022716 A1* | 9/2001 | Glaser | H02H 9/042 361/111 |
| 2001/0055187 A1* | 12/2001 | McLoughlin | H01C 7/126 361/127 |
| 2005/0168889 A1 | 8/2005 | Halvarsson et al. | |
| 2006/0250208 A1 | 11/2006 | Yu | |
| 2007/0103823 A1* | 5/2007 | Piasecki | H02H 9/007 361/38 |
| 2009/0323244 A1 | 12/2009 | Hoopes | |
| 2011/0013330 A1* | 1/2011 | Crevenat | H01H 83/20 361/115 |
| 2011/0205011 A1* | 8/2011 | Ehrhardt | H01H 37/76 337/14 |
| 2013/0200986 A1 | 8/2013 | Koprivsek | |
| 2013/0278129 A1 | 10/2013 | Krauss et al. | |
| 2014/0092514 A1 | 4/2014 | Chen | |
| 2014/0133057 A1 | 5/2014 | Durth et al. | |
| 2017/0288371 A1 | 10/2017 | Robert | |
| 2018/0151318 A1 | 5/2018 | Kamensek et al. | |
| 2018/0330908 A1 | 11/2018 | Vrhunc et al. | |
| 2019/0080826 A1* | 3/2019 | Kamensek | H01H 37/002 |
| 2019/0252142 A1 | 8/2019 | Kamensek et al. | |
| 2019/0267206 A1 | 8/2019 | Vrhunc et al. | |
| 2020/0036185 A1 | 1/2020 | Tsovilis et al. | |

FOREIGN PATENT DOCUMENTS

| | | | |
|---|---|---|---|
| DE | 19755082 A1 | | 6/1999 |
| DE | 29724817 U1 | | 4/2004 |
| DE | 102011102864 A1 | | 4/2012 |
| DE | 202019102722 U1 | | 8/2019 |
| DE | 102019112674 A8 | | 8/2020 |
| EP | 0905840 A1 | | 3/1999 |
| EP | 1075064 A1 | | 2/2001 |
| EP | 2573885 A1 | | 3/2013 |
| EP | 3166193 A1 | | 5/2017 |
| EP | 3654464 A1 | | 5/2020 |
| FR | 2451628 A1 | | 10/1980 |
| FR | 2991117 B3 | | 12/2014 |
| GB | 352756 A | | 7/1931 |
| GB | 2116362 A | | 9/1983 |
| KR | 101141915 B1 | * | 5/2012 |
| WO | 2010086286 A1 | | 8/2010 |
| WO | 2017129291 A1 | | 8/2017 |

OTHER PUBLICATIONS

Thermostatic Bimetals, Mar. 2012, Auerhammer Metallwerk GMBH. (Year: 2012).*
Notification of Transmittal of the International Search Report and the Written Opinion of the International Searching Authority, or the Declaration, in corresponding PCT Application No. PCT/EP2021/080842 (dated Feb. 24, 2022).
"Increased Safety for Switchgear Cabinets" data sheet, Dehn International (12 pages) (2017).
OptiFuse—Total Clearing Time, Retrieved from: https://www.optifuse.com/blog/t100120.php, Retrieved on: Nov. 24, 2020 (2 pages).
Translation of DIN-Standards, Built-In Equipment for Electrical Installations; Overall Dimensions and Related Mounting Dimensions (15 pages) (Dec. 1988).
"Gas Discharge Tubes—GDT" Iskra Zacite (2 pages) (Jul. 4, 2014).
"Gas-filled tube" Wikipedia, retrieved from: http://en.wikipedia.org/wiki/Gas-filled_tube (9 pages) (Retrieved on: Jan. 20, 2015).

* cited by examiner

SURGE PROTECTIVE DEVICE INCLUDING BIMETALLIC FUSE ELEMENT

RELATED APPLICATION(S)

The present application claims the benefit of and priority from U.S. Provisional Patent Application No. 63/111,195, filed Nov. 9, 2020, the disclosure of which is incorporated herein by reference.

FIELD OF THE INVENTION

The present invention relates to surge protective devices (SPDs) and, more particularly, to the protection of surge protective devices against short-circuit currents.

BACKGROUND OF THE INVENTION

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges is not acceptable and resulting downtime may be very costly.

Typically, sensitive electronic equipment may be protected against transient overvoltages and surge currents using surge protective devices (SPDs). For example, an overvoltage protection device may be installed at a power input of equipment to be protected, which is typically protected against overcurrents when it fails. Typical failure mode of an SPD is a short circuit. The overcurrent protection typically used is a combination of an internal thermal disconnector to protect the SPD from overheating due to increased leakage currents and an external fuse to protect the SPD from higher fault currents. Different SPD technologies may avoid the use of the internal thermal disconnector because, in the event of failure, they change their operation mode to a low ohmic resistance.

SPDs may use one or more active voltage switching/limiting components, such as a varistor or gas discharge tube, to provide overvoltage protection. These active voltage switching/limiting components may degrade at a rapid pace as they approach the end of their operational lifespans, which may result in their exhibiting continuous short circuit behavior. Referring now to FIG. 1, an electrical power supply installation or circuit 100 including a conventional SPD configuration includes an SPD 110 in series with an external fuse 140 connected in parallel across sensitive equipment. The SPD 110 is designed to protect the sensitive equipment from overvoltages and current surges and includes a metal oxide varistor (MOV) 120 and thermal disconnector 130.

In the example SPD configuration 100 shown in FIG. 1, the SPD 110 is connected in series with a standard external fuse 140 and is also connected upstream to the power source via a second fuse or circuit breaker 150. Conventional fuses, however, may not be able to withstand large surge currents and/or overvoltages generated by, for example, lightning events. As a result, they might blow or trip in response to such events. To achieve the desired high surge current rating, a fuse size typically has to be relatively large. In addition, the voltage applied to the sensitive equipment may be relatively high as it is the sum of the voltage across the SPD 110 ($V_{SPD}$), and the voltages developed across the connecting cables $V_{L1}$ and $V_{L2}$. The external fuse/circuit breaker design may also increase installation costs due to the use of large discrete components in the design.

SUMMARY OF THE INVENTION

According to some embodiments, an electrical fuse assembly includes electrically conductive first and second electrodes, and a bimetallic fuse element. The bimetallic fuse element electrically connects the first and second electrodes. The bimetallic fuse element is configured to disintegrate, and thereby disconnect the first electrode from the second electrode, in response to a current exceeding a prescribed trigger current of the bimetallic fuse element for at least a prescribed duration.

In some embodiments, the prescribed trigger current is a minimum expected short circuit current delivered by an overvoltage protection circuit when the overvoltage protection circuit has failed as a short circuit.

In some embodiments, the bimetallic fuse element is configured to carry a current of up to 25 kA for a time of up to 5 ms without the bimetallic fuse opening an electrical connection between the first electrode and the second electrode.

According to some embodiments, the bimetallic fuse element is configured to open an electrical connection between the first electrode and the second electrode responsive to carrying a short circuit current for not greater than a maximum short circuit response time threshold.

In some embodiments, the short circuit current is in a range of about 300 A-1000 A and the maximum short circuit response time threshold is not greater than 5 seconds.

In some embodiments, the bimetallic fuse element is configured to carry a leakage current from an overvoltage protection circuit without the bimetallic fuse opening an electrical connection between the first electrode and the second electrode.

In some embodiments, the leakage current is in a range of about 1 A-15 A.

According to some embodiments, the bimetallic fuse element includes a first metal layer having a first coefficient of thermal expansion, and a second metal layer having a second coefficient of thermal expansion. The first coefficient of thermal expansion is greater than the second coefficient of thermal expansion.

In some embodiments, the first metal layer comprises FeNi22Cr3 and the second metal layer comprises FeNi36.

In some embodiments, the bimetallic fuse element has a specific thermal curvature in range of $1 \times 10^{-6}$ to $30 \times 10^{-6}$ [$K^{-1}$] and a specific resistance in range of $1 \times 10^{-8}$ to $1 \times 10^{-6}$ [$\Omega m$].

In some embodiments, a thickness of the bimetallic fuse element is in a range of about 0.1 mm-3 mm.

In some embodiments, a width of the bimetallic fuse element is in a range of about 2-10 mm.

According to some embodiments, the bimetallic fuse element comprises a first end and a second end coupled by a body portion, the first end being bent at a first bending angle in a range of about 70 to 110 degrees relative to the body portion and at a first bending radius in a range of about 0.25 to 2 times a thickness of the body portion, the second end being bent at a second bending angle in a range of about 70 to 110 degrees relative to the body portion and at a second bending angle in a range of about 0.25 to 2 times the thickness of the body portion.

The electrical fuse assembly may include an electric arc extinguishing agent surrounding at least a portion of the bimetallic fuse element.

In some embodiments, the electric arc extinguishing agent is a flowable media.

In some embodiments, the flowable media includes silica granules.

According to some embodiments, the bimetallic fuse element is configured to deform and disintegrate, and thereby disconnect the first electrode from the second electrode, in response to a current exceeding the prescribed trigger current of the bimetallic fuse element for at least the prescribed duration.

According to some embodiments, the bimetallic fuse element includes a first end in electrical contact with the first electrode; the bimetallic fuse element includes a second end in electrical contact with the second electrode; the second end is not affixed to the second electrode; and the bimetallic fuse element is configured to deform and thereby displace the second end out of electrical contact with the second electrode in response to a current exceeding the prescribed trigger current of the bimetallic fuse element for at least the prescribed duration to thereby disconnect the first electrode from the second electrode.

According to some embodiments, the first end is affixed to the first electrode.

According to some embodiments, the bimetallic fuse element includes a first end and an opposing second end, the first end is affixed to the first electrode, and the second end is affixed to the second electrode.

In some embodiments, the bimetallic fuse element includes at least two branches configured to conduct current in parallel between the first and second electrodes.

In some embodiments, the bimetallic fuse element includes at least three branches configured to conduct current in parallel between the first and second electrodes.

According to some embodiments, the bimetallic fuse element includes at least one preformed weak point; and the bimetallic fuse element is configured to disintegrate at the at least one preformed weak point, and thereby disconnect the first electrode from the second electrode, in response to a short circuit current exceeding a prescribed trigger current of the bimetallic fuse element for at least a prescribed duration.

According to some embodiments, the electrical fuse assembly has a total resistance greater than 1 m$\Omega$ and a surge impulse current rating of at least 25 kA in response to a 10/350 surge current pulse shape. In some embodiments, the electrical fuse assembly has a total resistance in a range of about 1 m$\Omega$-5 m$\Omega$. In some embodiments, the electrical fuse assembly has a continuous current rating of about 20 A. In some embodiments, the fuse element comprises a material having a specific resistance in a range of about $1 \times 10^{-7}$ $\Omega$m-$5 \times 10^{-7}$ $\Omega$m. In some embodiments, the electrical fuse assembly has an arc voltage associated therewith in a range of about 800 V-900V.

According to some embodiments of the invention, a fused surge protective device (SPD) module includes a first electrical terminal, a second electrical terminal, an overvoltage protection circuit connected between the first electrical terminal and the second electrical terminal, and a bimetallic fuse including a bimetallic fuse element connected in series with the overvoltage protection circuit between the first and second electrical terminals.

The fused SPD module may include a module housing, wherein the overvoltage protection circuit and the bimetallic fuse are each mounted in the module housing.

In some embodiments, the bimetallic fuse element is configured to disintegrate, and thereby disconnect the first electrical terminal from the second electrical terminal, in response to a short circuit current from the overvoltage protection circuit exceeding a prescribed trigger current of the bimetallic fuse element for at least a prescribed duration.

In some embodiments, the prescribed trigger current is a minimum expected short circuit current delivered by the overvoltage protection circuit when the overvoltage protection circuit has failed as a short circuit.

According to some embodiments, the bimetallic fuse is configured to carry a current of up to 25 kA for a time of up to 5 ms without the bimetallic fuse opening an electrical connection between the first electrical terminal and the second electrical terminal.

In some embodiments, the bimetallic fuse is configured to open an electrical connection between the first electrical terminal and the second electrical terminal responsive to carrying a short circuit current from the overvoltage protection circuit for not greater than a maximum short circuit response time threshold.

According to some embodiments, the short circuit current from the overvoltage protection circuit is in a range of about 300 A-1000 A and the maximum short circuit response time threshold is not greater than 5 seconds.

According to some embodiments, the overvoltage protection circuit comprises a metal oxide varistor (MOV) having a leakage current associated therewith, and the bimetallic fuse is configured to carry the leakage current without the bimetallic fuse opening an electrical connection between the first electrical terminal and the second electrical terminal.

In some embodiments, the leakage current is in a range of about 1 A-15 A.

In some embodiments, the bimetallic fuse element includes: a first metal layer having a first coefficient of thermal expansion; and a second metal layer having a second coefficient of thermal expansion. The first coefficient of thermal expansion is greater than the second coefficient of thermal expansion.

In some embodiments, the first metal layer comprises FeNi22Cr3 and the second metal layer comprises FeNi36.

The fused SPD module may further include a thermal disconnector that is connected in series with the overvoltage protection circuit, the thermal disconnector mechanism being configured to electrically disconnect the first electrical terminal from the second electrical terminal responsive to a thermal event.

In some embodiments, the overvoltage protection circuit comprises at least one active voltage-switching/limiting component.

In some embodiments, the at least one active voltage-switching/limiting component includes a varistor.

According to some embodiments, the at least one active voltage-switching/limiting component includes a gas discharge tube.

According to some embodiments, the bimetallic fuse includes an electric arc extinguishing agent surrounding at least a portion of the bimetallic fuse element.

In some embodiments, the electric arc extinguishing agent is a flowable media.

In some embodiments, the flowable media includes silica granules.

According to some embodiments, the bimetallic fuse element is configured to deform and disintegrate in response to a current to thereby disconnect the first electrical terminal from the second electrical terminal.

According to some embodiments, the fused SPD module includes first and second electrically conductive electrodes; the bimetallic fuse element electrically connects the first and second electrodes; the bimetallic fuse element includes a first end in electrical contact with the first electrode; the bimetallic fuse element includes a second end in electrical contact with the second electrode; the second end is not affixed to the second electrode; and the bimetallic fuse element is configured to deform and thereby displace the second end out of electrical contact with the second electrode in response to a current to thereby disconnect the first electrode from the second electrode.

In some embodiments, the first end is affixed to the first electrode.

According to some embodiments, the fused SPD module includes first and second electrically conductive electrodes; the bimetallic fuse element electrically connects the first and second electrodes; the bimetallic fuse element includes a first end and an opposing second end; the first end is affixed to the first electrode; and the second end is affixed to the second electrode.

In some embodiments, the bimetallic fuse element includes at least two branches configured to conduct current in parallel between the first and second electrodes.

According to some embodiments, the bimetallic fuse element includes at least one preformed weak point; and the bimetallic fuse element is configured to disintegrate at the at least one preformed weak point, and thereby disconnect the first electrode from the second electrode, in response to a current from the overvoltage protection circuit.

According to some embodiments, a protected electrical power supply circuit includes an overvoltage protection circuit, and a bimetallic fuse element connected in electrical series with the overvoltage protection circuit. The bimetallic fuse element is configured to disintegrate, and thereby interrupt the protected electrical power supply circuit, in response to a short circuit current from the overvoltage protection circuit exceeding a prescribed trigger current of the bimetallic fuse element for at least a prescribed duration.

According to some embodiments, the prescribed trigger current is a minimum expected short circuit current delivered by the overvoltage protection circuit when the overvoltage protection circuit has failed as a short circuit.

In some embodiments, the overvoltage protection circuit comprises an active voltage-switching/limiting component.

In some embodiments, the bimetallic fuse element is configured to deform and disintegrate, and thereby interrupt the protected electrical power supply circuit, in response to a current exceeding the prescribed trigger current of the bimetallic fuse element for at least the prescribed duration.

According to some embodiments, an electrical fuse assembly includes electrically conductive first and second electrodes, a bimetallic fuse element electrically connecting the first and second electrodes, and an electric arc extinguishing agent surrounding at least a portion of the bimetallic fuse element.

According to some embodiments, the electric arc extinguishing agent is a flowable media.

In some embodiments, the flowable media includes silica granules.

According to some embodiments, a device includes a fuse assembly including electrically conductive first and second electrodes, and a fuse element electrically connecting the first and second electrodes. The fuse assembly has a total resistance greater than 1 mΩ and a surge impulse current rating of at least 25 kA in response to a 10/350 surge current pulse shape.

In some embodiments, the fuse assembly has a total resistance in a range of about 1 mΩ-5 mΩ.

In some embodiments, the fuse assembly has a continuous current rating of about 20 A.

According to some embodiments, the fuse element comprises a monolithic metallic alloy.

In some embodiments, the fuse element comprises a bimetallic alloy including a plurality of metallic layers.

According to some embodiments, the fuse element comprises a material having a specific resistance in a range of about $1\times10^1$ Ωm-$5\times10^{-7}$ Ωm.

According to some embodiments, the fuse assembly has an arc voltage associated therewith in a range of about 800 V-900V.

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
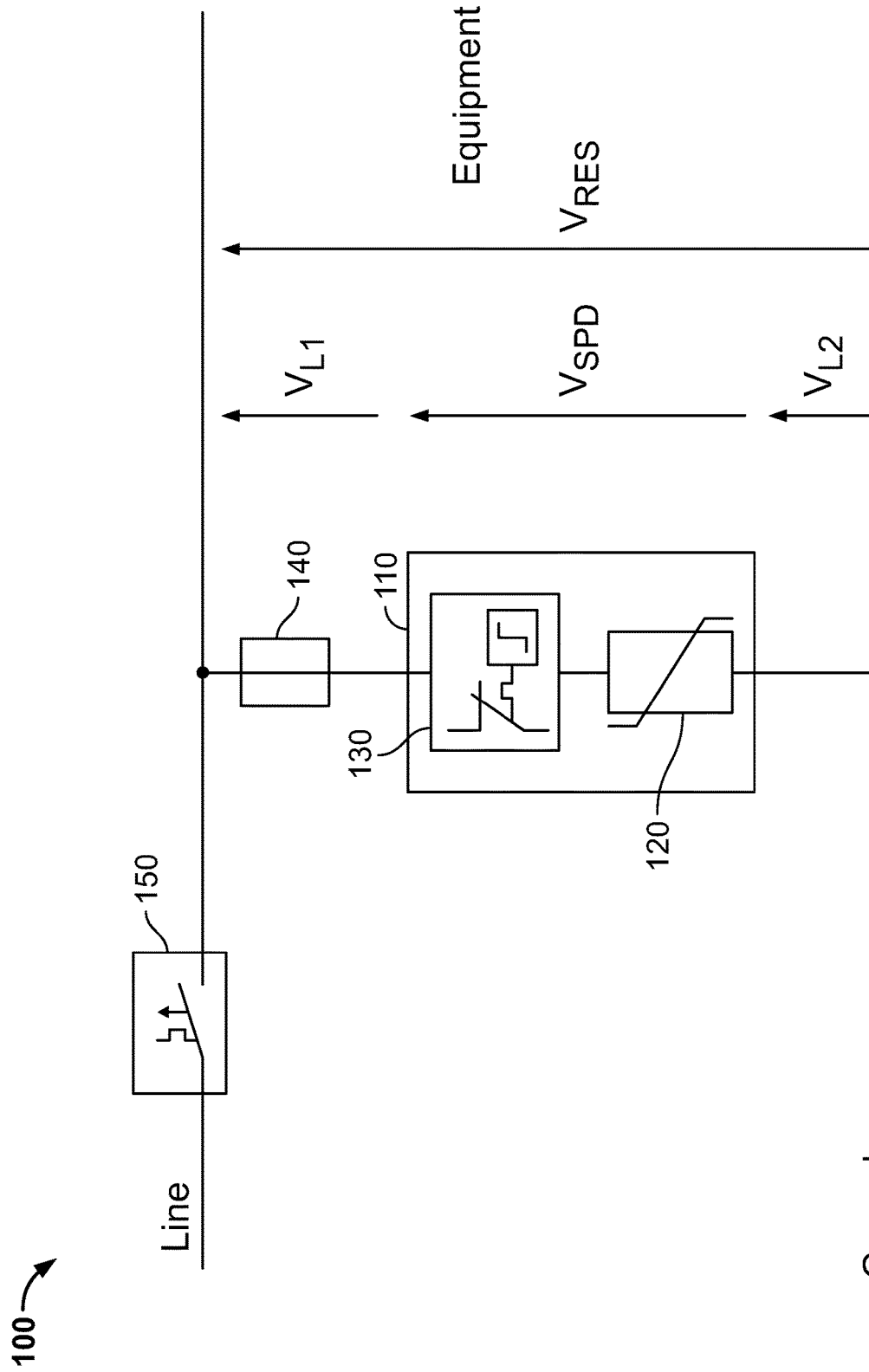
FIG. 1 is a block diagram that illustrates an electrical power supply circuit including a conventional surge protective device (SPD) configuration.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It is noted that aspects described with respect to one embodiment may be incorporated in different embodiments although not specifically described relative thereto. That is, all embodiments and/or features of any embodiments can be implemented separately or combined in any way and/or combination. Moreover, other apparatus, methods, and systems according to embodiments of the inventive concept will be or become apparent to one with skill in the art upon review of the following drawings and detailed description. It is intended that all such additional apparatus, methods, and/or systems be included within this description, be within the scope of the present inventive subject matter, and be protected by the accompanying claims.

As used herein, "monolithic" means an object that is a single, unitary piece formed or composed of a material without joints or seams. Alternatively, a unitary object can be a composition composed of multiple parts or components secured together at joints or seams.

Some embodiments of the inventive concept stem from a realization that fuses or circuit breakers used to protect surge protective devices (SPDs) from short circuit currents when they fail by disconnecting them from the circuit have generally very high current ratings. These high current ratings may allow the fuses or circuit breakers to handle high impulse voltages and/or impulse currents from overvoltage events, such as lightning strikes, when configured in series with the SPD between the power line and ground or handle ongoing current when provided inline in the power line. To achieve such high current ratings, the fuses and/or circuit breakers may be large and require additional expense in installation due to being a discrete component from the SPD.

According to some embodiments of the inventive concept, an overvoltage protection circuit may be connected in series with a bimetallic fuse element to form, in combination, a fused SPD circuit. In some embodiments, the fused SPD circuit is provided in the form of a fused SPD unit or module, wherein the overvoltage protection circuit and the bimetallic fuse element are each integrated in the fused SPD unit or module. In some embodiments, the bimetallic fuse element is a bimetallic strip.

The fused SPD circuit may include a thermal disconnector device along with the overvoltage protection circuit and the bimetallic fuse element. In some embodiments, the thermal disconnector device is integrated in the fused SPD unit or module along with the overvoltage protection circuit and the bimetallic fuse element.

The overvoltage protection circuit of the fused SPD circuit may include one or more active voltage-switching/limiting components, such as a varistor or gas discharge tube.

The bimetallic strip may be configured to mechanically open the circuit through deformation of the bimetallic strip within a specified time period in response to a minimum short circuit current received therethrough from the overvoltage protection circuit (referred to herein as the "minimum SPD short circuit current"). For example, in a power line application, the minimum SPD short circuit current expected through the overvoltage protection circuit may be in a range from 300 A-1000 A. This minimum SPD short circuit current may be called a trigger current threshold. The short circuit current through the overvoltage protection circuit and the bimetallic fuse element may also be called a trigger current. A standard for protecting SPDs from short circuit current events may be that the SPD be disconnected from the circuit within 5 seconds of the SPD short circuit current event. Thus, when used in the example power line application, the bimetallic fuse assembly may be configured such that the bimetallic strip deforms within 5 seconds to open the circuit in response to an SPD short circuit current of at least 300 A. The bimetallic strip element after deforming will quickly evaporate due to arcing between the electrodes of the bimetallic fuse device.

In some embodiments, the bimetallic fuse element forms a part of a bimetallic fuse device or assembly. The bimetallic fuse device may include an electric arc extinguishing agent, such as SiO2, to terminate the arcing. The SiO2 may be provided in the form of sand or powder.

The bimetallic fuse device may also be configured to handle very large SPD surge impulse currents that are generated due to overvoltage or current surge events, such as lightning strikes. An SPD may be required to re-direct a surge impulse current of up to 25 kA, which lasts between 1 ms to 5 ms, to ground. The bimetallic fuse device, according to some embodiments of the inventive concept, may conduct such high currents for up to 5 ms without the bimetallic strip element deforming to open the circuit.

The bimetallic fuse device may conduct relatively low currents therethrough corresponding to the leakage current associated with a varistor in an overvoltage protection circuit. These leakage currents may be relatively low, such as, for example, 1 A-15 A. The bimetallic fuse device may be configured so that the bimetallic fuse element does not deform to open the circuit before the overvoltage protection circuit heats up sufficiently that a thermal disconnector opens the circuit to terminate the leakage current.

Figure 2:
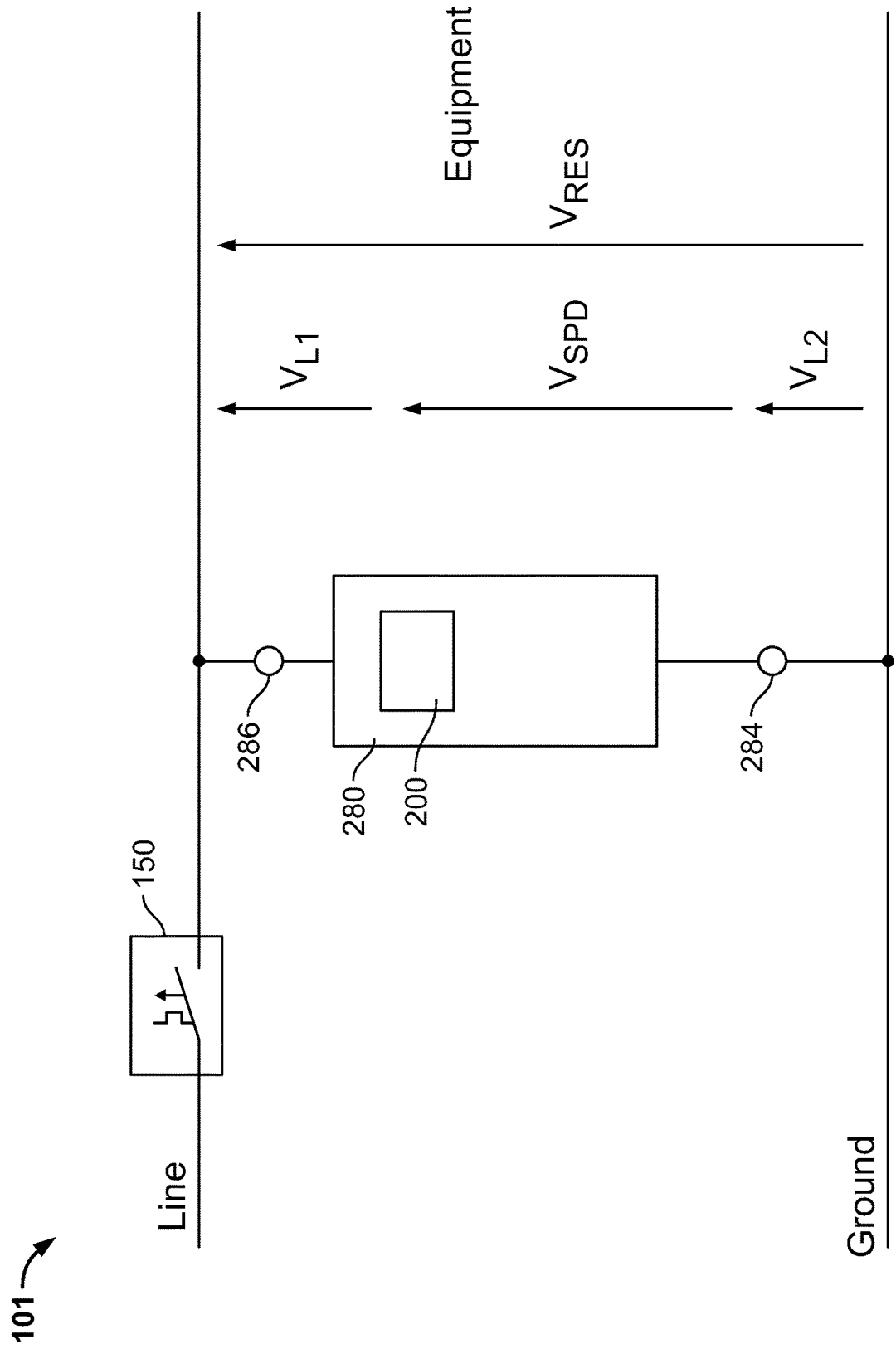
FIG. 2 is a block diagram that illustrates an electrical power supply circuit including a surge protective device (SPD) configuration in accordance with some embodiments of the inventive concept.

With reference to FIGS. 2-12, a bimetallic fuse device or assembly 200 according to some embodiments is shown therein. The fuse assembly 200 may be provided, installed and used as a component in a protection circuit of a power supply circuit as described above with reference to FIG. 1 in place of the fuse 140, for example, to form a protected power supply circuit 101 as shown in FIG. 2.

Figure 3:
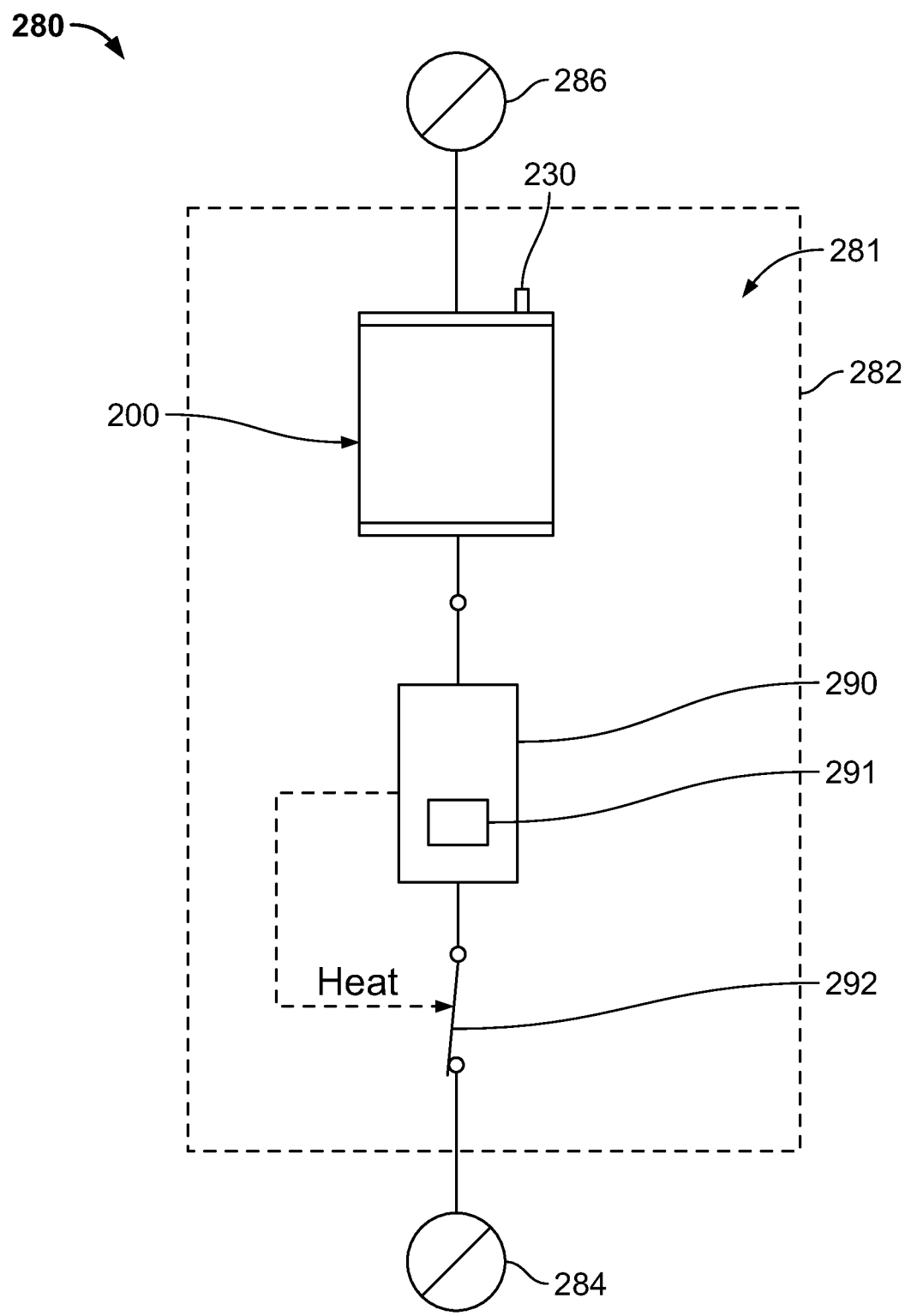
FIG. 3 is a block diagram of a fused SPD circuit and module including a bimetallic fuse assembly in accordance with some embodiments of the inventive concept.
Figure 4:
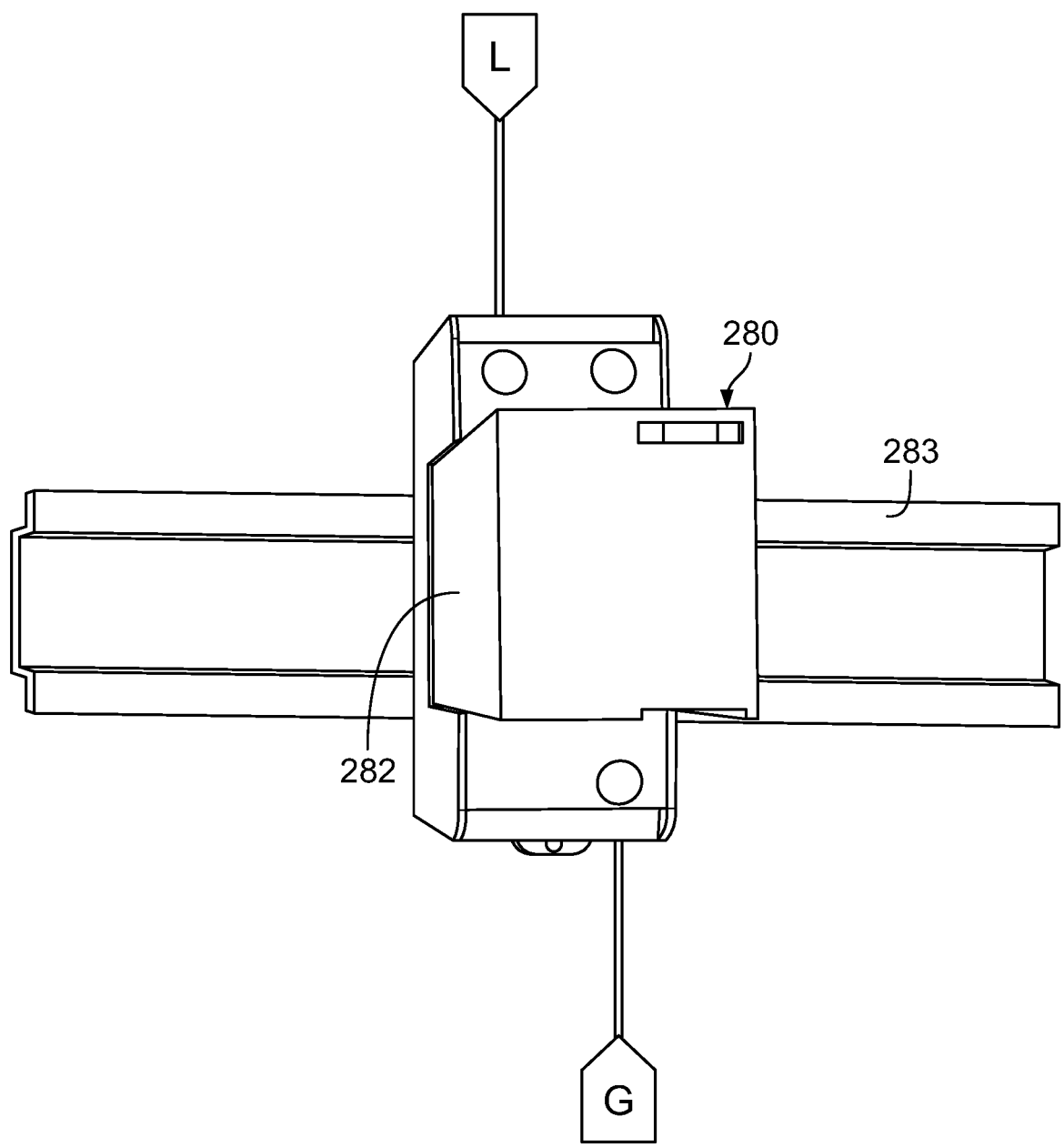
FIG. 4 is a front perspective view of the fused SPD module of FIG. 3 mounted on a DIN rail.
Figure 5:
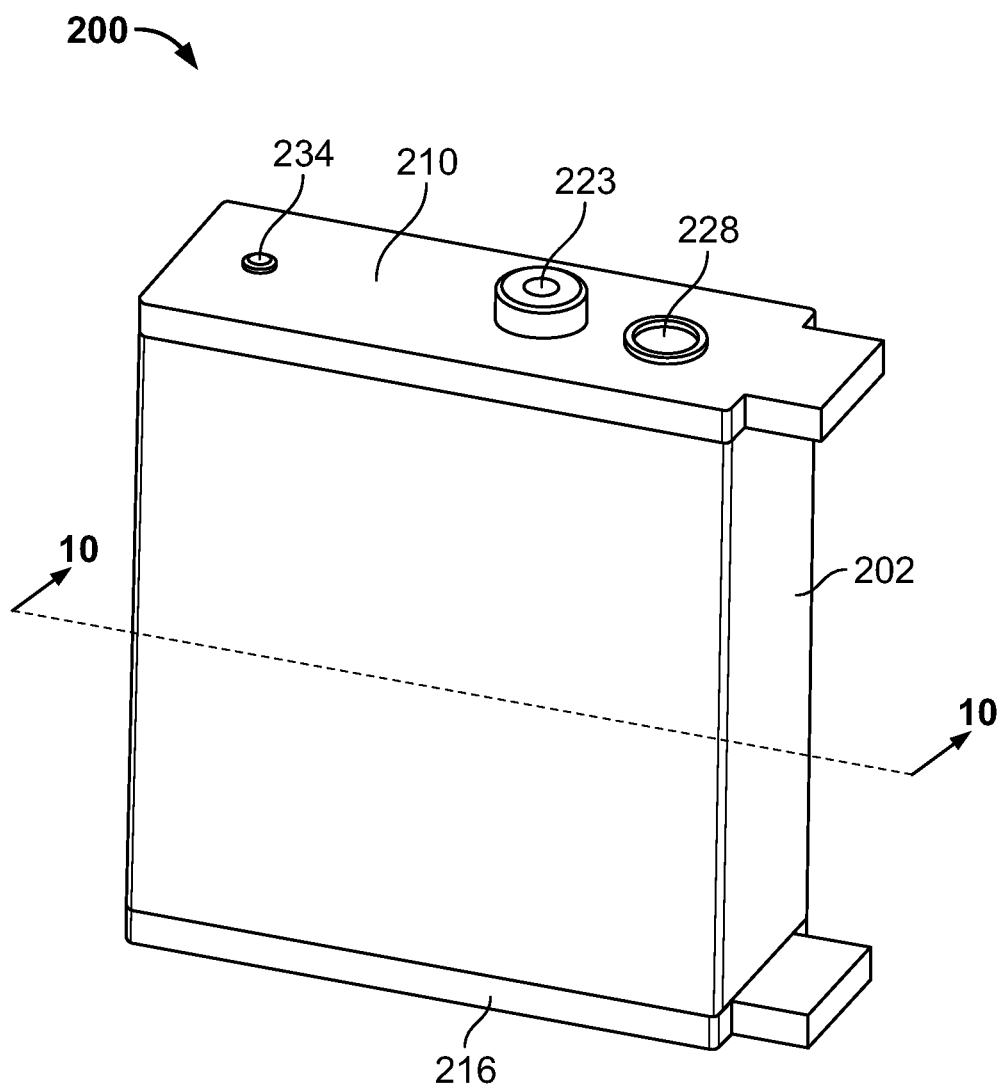
FIG. 5 is a perspective view of the bimetallic fuse assembly of FIG. 3.
Figure 6:
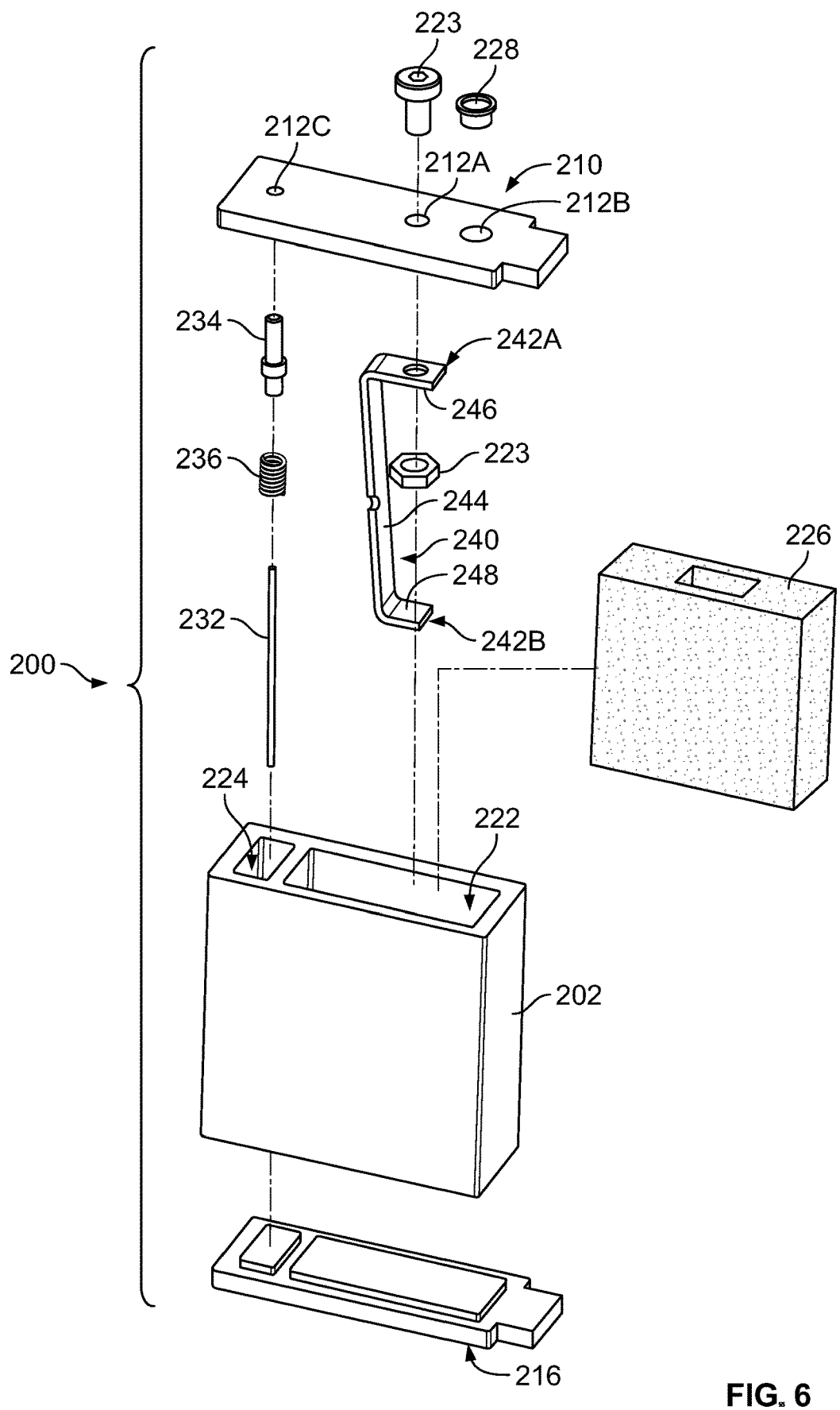
FIG. 6 is an exploded, perspective view of the bimetallic fuse assembly of FIG. 5.

In some embodiments, the fuse assembly 200 is integrated into a fused surge protective device (SPD) unit or module 280 including an overvoltage protection circuit (OPC) 290, as illustrated in FIGS. 3 and 4. In this case, the fuse assembly 200 operates as an integrated backup fuse. In some embodiments, the fused SPD module 280 is configured to mount on a DIN rail 283 as shown in FIG. 4, for example. In other embodiments, the fuse assembly 200 may be provided, installed and used as an individual component in a protection circuit of a power supply circuit (e.g., not physically integrated in a module with the OPC 290).

With reference to FIG. 3, the fused SPD module 280 includes the fuse assembly 200, a module housing 282, a first electrical terminal 284, a second electrical terminal 286, the OPC 290, and a thermal disconnector 292. The fuse assembly 200, the OPC 290, and the thermal disconnector 292 are disposed in the housing 282, and are electrically connected between the terminals 284 and 286 to form a fused SPD electrical circuit 281.

The OPC 290 may be any suitable overvoltage protection circuit. In some embodiments, the OPC 290 includes an active voltage-switching or active voltage limiting component (referred to herein as a "voltage-switching/limiting component") 291.

In some embodiments, the OPC 290 is a varistor-based overvoltage protection circuit and the voltage-switching/limiting component 291 is a varistor. In some embodiments, the voltage-switching/limiting component 291 is a metal oxide varistor (MOV)).

In some embodiments, the voltage-switching/limiting component 291 is a gas discharge tube (GDT).

The voltage-switching/limiting component 291 may also be another type of voltage-switching/limiting surge protective device. Other types of voltage-switching/limiting component 291 that may form, or form a part of, the OPC 290 may include spark gap devices, multi-cell GDTs (e.g., as disclosed in U.S. Pat. No. 10,685,805 to Rozman and U.S. Pat. No. 10,186,842 to Rozman, the disclosures of which are incorporated herein by reference), diodes, or thyristors.

The OPC 290 may include or consist of only a single voltage-switching/limiting component 291. In some embodiments, the OPC 290 includes or consists of only the active voltage-switching/limiting component(s) 291 and associated electrical connections, if any.

The OPC 290 may include a plurality of voltage-switching/limiting components 291. The OPC 290 may include one or more voltage-switching/limiting components 291 in combination with other electrical components. In some embodiments, the OPC 290 includes multiple varistors (connected in electrical parallel or series between the module terminals), multiple GDTs (e.g., connected in electrical series), and/or both varistor(s) and GDT(s) (e.g., connected in electrical series with the varistor(s)), and/or other circuit elements, such as resistors, inductors, or capacitors.

Gas discharge tubes (GDTs) and metal oxide varistors (MOV) may be used in surge protection devices, but both GDTs and MOVs have advantages and drawbacks in shunting current away from sensitive electronic components in response to overvoltage surge events. For example, MOVs have the advantage of responding rapidly to surge events and being able to dissipate the power associated with surge events. But MOVs have the disadvantages of having increased capacitance relative to GDTs and passing a leakage current therethrough even in ambient conditions. MOVs may also have a decreased lifetime expectancy relative to GDTs. GDTs have the advantage of having extremely low to no leakage current, minimal capacitance, and an increased lifetime expectancy relative to MOVs. But GDTs are not as responsive to surge events as MOVs. Moreover, when a GDT fires and transitions into the arc region in response to a surge event, the GDT may remain in a conductive state if the ambient voltage on the line to which the GDT is connected exceeds the arc voltage. The GDT may mitigate current leakage issues associated with the MOV, which may extend the working life of the MOV.

A GDT is a sealed device that contains a gas mixture trapped between two electrodes. The gas mixture becomes conductive after being ionized by a high voltage spike. This high voltage that causes the GDT to transition from a non-conducting, high impedance state to a conducting state is known as the sparkover voltage for the GDT. The sparkover voltage is commonly expressed in terms of a rate of rise in voltage over time. For example, a GDT may be rated so as to have a DC sparkover voltage of 500 V under a rate of rise of 100 V/s. When a GDT experiences an increase in voltage across its terminals that exceeds its sparkover voltage, the GDT will transition from the high impedance state to a state known as the glow region. The glow region refers to the time region where the gas in the GDT starts to ionize and the current flow through the GDT starts to increase. During the glow region, the current through the GDT will continue to increase until the GDT transitions into a virtual short circuit known as the arc region. The voltage developed across a GDT when in the arc region is known as the arc voltage and is typically less than 100 V. A GDT takes a relatively long time to trigger a transition from a high impedance state to the arc region state where it acts as a virtual short circuit.

A varistor, such as a MOV, when in a generally non-conductive state still conducts a relatively small amount of current caused by reverse leakage through diode junctions. This leakage current may generate a sufficient amount of heat that a device, such as the thermal disconnector 292, is used to reduce the risk of damage to components of the fused SPD 280. When a transient overvoltage event occurs, a varistor will conduct little current until reaching a clamping voltage level at which point the varistor will act as a virtual short circuit. Typically, the clamping voltage is relatively high, e.g., several hundred volts, so that when a varistor passes a high current due to a transient over voltage event a relatively large amount of power may be dissipated. In contrast to a GDT, a varistor has a relatively short transition time from a high impedance state to the virtual short circuit state corresponding to the time that it takes for the voltage developed across the varistor to reach the clamping voltage level.

The thermal disconnector 292 may be any suitable thermal disconnector device configured and positioned to disconnect the OPC 290 (and thereby the voltage-switching/limiting component 291) from the terminal 284 in response to heat generated by the OPC 290 (for example, by the voltage-switching/limiting component 291). The thermal disconnector 292 may include a spring-loaded switch having a solder connection that is melted or softened by excess heat from the OPC 290 (e.g., generated by an MOV 291 thereof) to permit the switch to open.

With reference to FIGS. 5-10, the fuse assembly 200 has a first end 200A and an opposing second end 200B. The fuse assembly 200 includes a fuse assembly housing 202, a first electrode 210 (at the end 200A), a second electrode 216 (at the end 200B), a partition wall 220, a fastener 223, an electric arc extinguishing agent 226, a plug 228, an indicator mechanism 230, and a bimetallic fuse link or element 240.

The housing 202, the partition 220, and the electrodes 210, 216 define a main chamber 222 and an adjacent auxiliary chamber 224.

The housing 202 and the partition wall 220 may be formed of any suitable electrically insulating material. In some embodiments, the housing 202 and the partition wall 220 are formed of ceramic.

The electrodes 210, 216 may be formed of any suitable electrically conductive metal. In some embodiments, the electrodes 210, 216 are formed of copper, brass, stainless steel, aluminum copper (AlCu) or tungsten copper (WCu). The electrodes 210, 216 may be formed of a base metal as stated above with additional surface plating (galvanization) of nickel or tin.

The electric arc extinguishing agent 226 may be formed of any suitable material. In some embodiments, the arc extinguishing agent 226 is a flowable media. In some embodiments, the arc extinguishing agent is flowable granules. In some embodiments, the electric arc extinguishing agent 226 is silica granules (silicon dioxide). The granule size and packing may be selected to optimize the performance of the extinguishing agent 226 as described herein. The main chamber 222 is filled with the agent 226 through a fill opening 212B in the electrode 210, and then sealed with the plug 228.

The indicator mechanism 230 includes an electrically resistive wire 232, a metallic indicator member or pin 234, and a preload spring 236 located in the auxiliary chamber 224. The indicator mechanism 230 is assembled such that the resistive wire 232 is attached (e.g., welded) at one end 232A to the electrode 216, and is attached at its opposing end 232B to the indicator pin 234. The spring 236 is supported by extrusions on the housing 202 in a compressed state such that the spring 236 applies tension to the wire 232 and biases the indicator pin 234 towards the electrode 210. The end of the pin 234 is inserted in an indicator opening 212C in the electrode 210 and makes electrical contact therewith. When the resistive wire 232 disintegrates, as discussed below, the spring 236 forces the pin 234 to slide outwardly through the opening 212C to provide a visible or mechanical indication or alert.

In some embodiments, the resistive wire 232 has a wire diameter in the range of from about 0.1 to 0.5 mm. In some embodiments, the resistive wire 232 is formed of a resistive material having a resistance in the range of from about 0.2 to 1 Ohm/cm for wire diameters in the range of from about 0.1 to 0.5 mm.

The auxiliary chamber 224 may remain unfilled with the agent 226. In other embodiments, the partition 220 may be omitted and the indicator mechanism 230 may be located in the main chamber 222.

The fuse element 240 is a bimetallic strip having opposed first and second ends 242A, 242B. The strip includes an elongate connecting body or leg 244, an integral first tab 246 on the first end 242A, and an integral second tab 248 on the second end 242A. Holes 254A and/or cutouts 254B may be defined in the strip 240.

The bimetallic fuse element 240 includes a first or inner metal band or layer 250 and a second or outer metal band or layer 252 mated (e.g., face to face) with the inner metal layer 250 along the length of the fuse element 240. The inner metal layer 250 and the outer metal layer 252 are formed of different metal compositions from one another. More particularly, the outer metal layer 252 is formed of a metal having a higher coefficient of thermal expansion than that of the inner metal layer 250. When the fuse element 240 is heated, the different rates of thermal expansion between the metal layers 250, 252 will cause the fuse element 240 to bend or deform in a deformation direction B.

Figure 7:
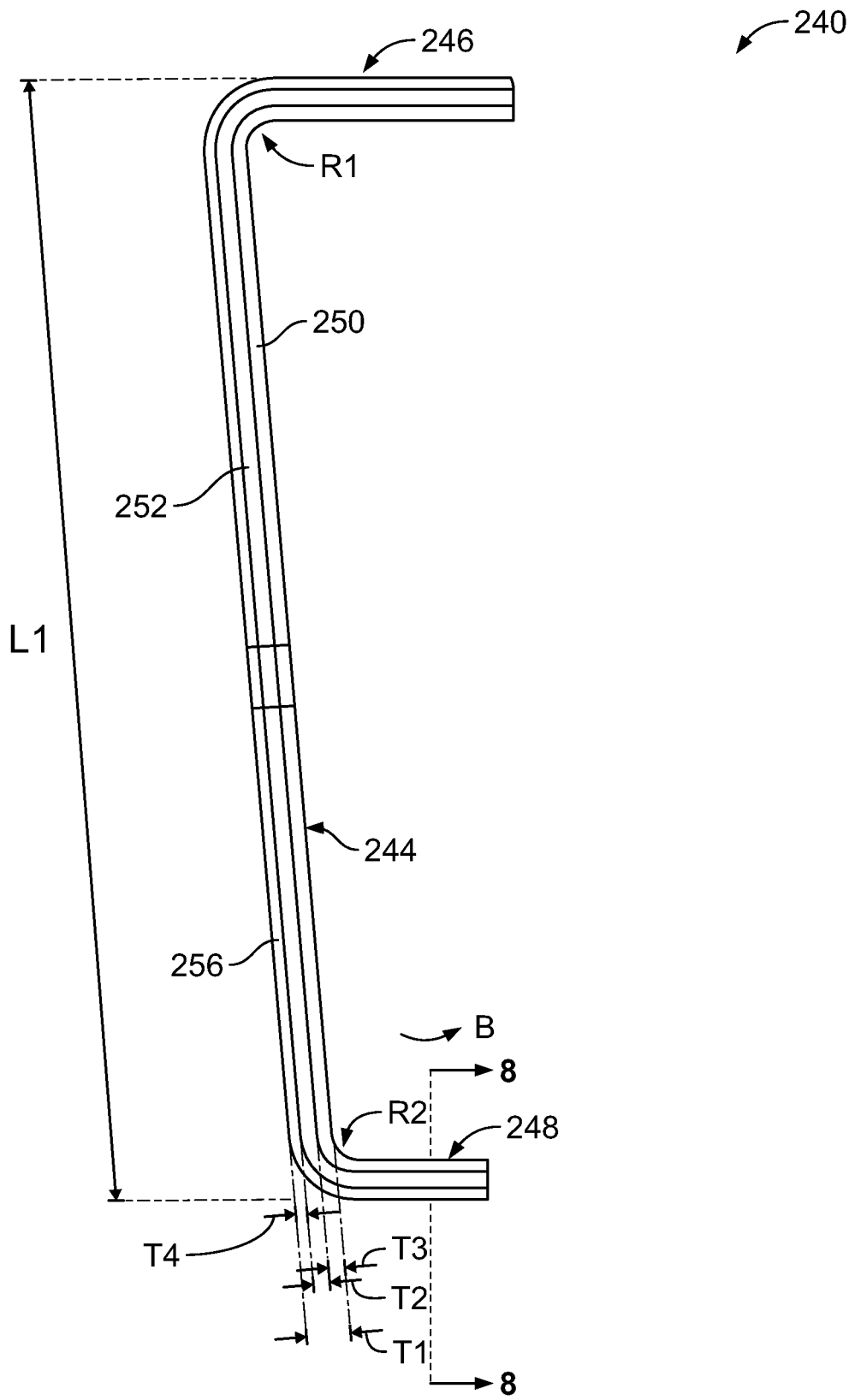
FIG. 7 is a front view of a bimetallic fuse element forming a part of the bimetallic fuse assembly of FIG. 5.
Figure 8:
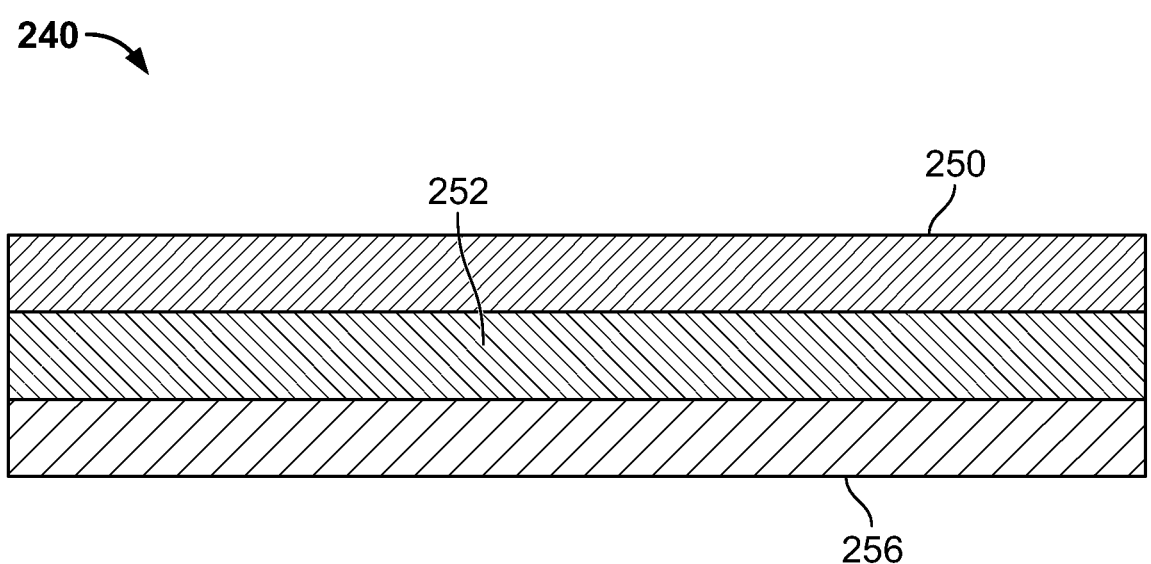
FIG. 8 is a cross-sectional view of the bimetallic fuse assembly of FIG. 7 taken along the line 8-8 of FIG. 7.
Figure 9:
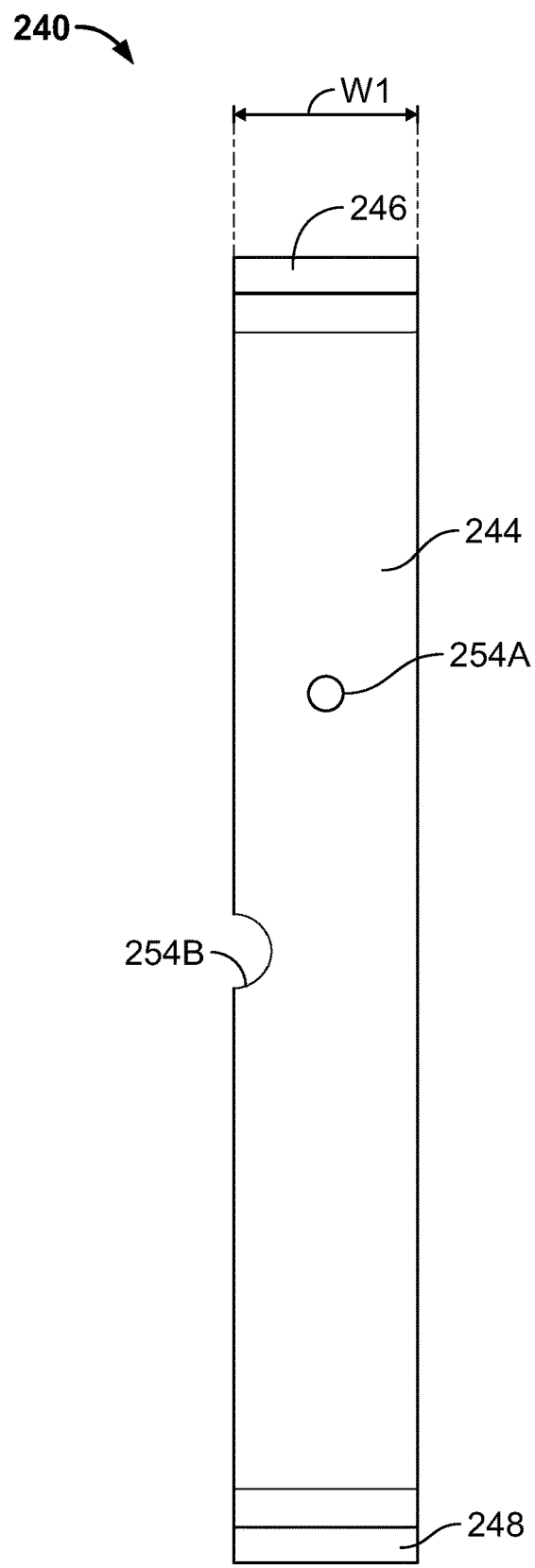
FIG. 9 is a right side view of the bimetallic fuse element of FIG. 7.

In some embodiments, the bimetallic fuse element 240 further includes a third metal band or layer 256 mated (e.g., face to face) with the inner metal layer 250 or the outer metal layer 252 (as illustrated in FIG. 7) along the length of the fuse element 240. In some embodiments, the third metal layer 256 is formed of a metal having a higher electrical conductivity than the metals or alloys forming the inner metal layer 250 and the outer metal band or layer 252.

The metal layers 250, 252 may be formed of any suitable metals. In some embodiments, the inner metal layer 250 (i.e., the low expansion side layer) is formed of FeNi36 nickel alloy, and the outer metal layer 252 (i.e., the high expansion side layer) is formed of FeNi22Cr3 nickel alloy.

In some embodiments, the fuse element 240 has a specific thermal curvature in the range of $1 \times 10^{-6}$ to $30 \times 10^{-6}$ [$K^{-1}$] and a specific resistance in the range of $1 \times 10^{-8}$ to $1 \times 10^{-6}$ [$\Omega m$].

In some embodiments, the fuse element 240 has a strip width W1 (FIG. 9) in the range of from about 2 mm to 10 mm.

In some embodiments, the fuse element 240 has a strip length L1 (FIG. 7) in the range of from about 20 mm to 70 mm.

In some embodiments, the fuse element 240 has a strip thickness T1 (FIG. 7) in the range of from about 0.5 mm to 2 mm.

In some embodiments, the outer metal layer 252 of the fuse element 240 has a layer thickness T2 (FIG. 7) in the range of from about 1/3 to 2/3 times the thickness T1.

In some embodiments, the inner metal layer 250 of the fuse element 240 has a layer thickness T3 (FIG. 7) in the range of from about 1/3 to 2/3 times the thickness T1.

In some embodiments, the third metal layer 256 of the fuse element 240 has a layer thickness T4 (FIG. 7) in the range of from about 0.05 to 0.2 times the thickness T1.

In some embodiments, the bend in the fuse element 240 between the first tab 246 and the leg 244 has a radius R1 (FIG. 7) in the range of from about 0.25 to 3 times the thickness T1.

In some embodiments, the bend in the fuse element 240 between the second tab 248 and the leg 244 has a radius R2 (FIG. 7) in the range of from about 0.25 to 3 times the thickness T1.

In some embodiments, the tab 246 is bent at an angle in the range of from about 70 to 110 degrees relative to the leg 244 and at a bending radius in the range of from about 0.25 to 2 times the thickness T1, and the tab 248 is bent at an angle in the range of from about 70 to 110 degrees relative to the leg 244 and at a bending radius in the range of from about 0.25 to 2 times the thickness T1.

The end 242A of the fuse element 240 is secured, anchored or affixed to the first electrode 210 by the fastener 223 (e.g., nut and bolt, screw, rivet, or weld), which may extend through an opening 212A in the electrode 210. The tab 246 is thereby held in electrical contact with the interior surface 214 of the electrode 210.

The opposing end 242B of the fuse element 240 is held with the tab 248 in electrical contact with the interior surface 218 of the second electrode 216. The tab 248 may be lightly loaded against the surface 218 (e.g., by a small elastic deflection of the fuse element 240), but the end 242B is not affixed to the electrode 216. That is, the end 242B is free.

The fuse element 240 is generally surrounded by the agent 226 that fills the main chamber 222.

The fuse assembly 200 and the fused SPD assembly 280 may operate as follows in service.

According to some embodiments of the inventive concept, the fused SPD 280 may be configured to operate under four different conditions: 1) normal operation; 2) an overvoltage or current surge event in which the fused SPD 280 is designed to shunt an SPD surge impulse current to ground; 3) an ambient leakage current event associated with the OPC 290 (e.g., associated with diode junctions of a varistor 291 of the OPC 290); and 4) a short circuit event in which the voltage-switching/limiting component 291 of the OPC 290 degrades at the end of its lifecycle and begins acting or operating as a short circuit.

Figure 10:
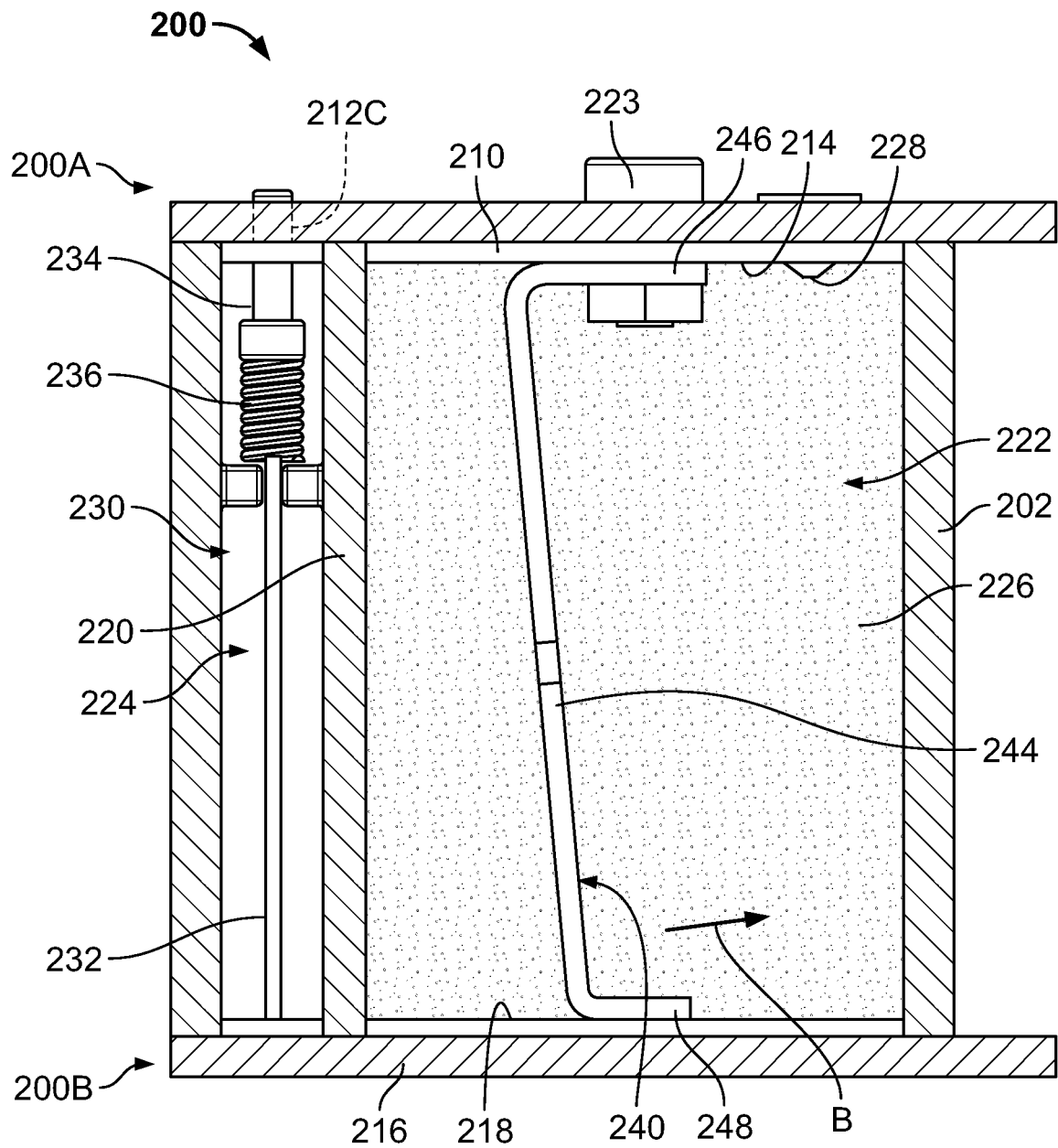
FIG. 10 is a cross-sectional view of the bimetallic fuse assembly of FIG. 3 taken along the line 10-10 of FIG. 5.

The fuse assembly 200 is constructed and installed with the fuse assembly 200 in the configuration shown in FIG. 10. The electrodes 210 and 216 are electrically connected by the fuse element 240, which makes electrical contact with the electrodes 210 and 216 via the tabs 246 and 248, respectively. The terminal 286 is electrically connected to the Line (L) of the circuit 101, and the terminal 284 is electrically connected to the Ground (G) of the circuit 101 (FIG. 2).

As discussed above, during normal operation, the SPD OPC does not let current through, and the fuse assembly 200 therefore is not supplied with a current. The fuse assembly 200 remains in the configuration shown in FIG. 10.

As discussed above, when an overvoltage or current surge event applies a surge impulse current to the circuit 281, the OPC 290 will effectively become a short circuit, and the fuse assembly 200 is supplied with an SPD surge impulse current. The voltage-switching/limiting component 291 (e.g., varistor or GDT) of the OPC 290 is designed to shunt the surge impulse current associated with such events to ground to protect sensitive equipment. The SPD surge impulse current may be on the order of tens of kA, but will typically last only a short duration (in the range of from about tens of microseconds to a few milliseconds).

The fuse element 240 is capable of conducting this SPD surge impulse current without disintegrating or deforming the fuse element 240. The fuse assembly 200 remains in the configuration shown in FIG. 10. The fuse assembly 240 therefore will not interrupt the SPD surge impulse current, and will remain usable for further operation. Accordingly, the bimetallic fuse assembly 200 may be configured to carry the SPD surge impulse current therethrough without the bimetallic fuse element 240 deforming to open the circuit. In some embodiments of the inventive concept, the bimetallic fuse assembly 200 may be configured to carry therethrough an SPD surge impulse current of up to 25 kA for a time of up to 5 ms, a 25 kA 8/20 impulse waveform, and/or 25 kA 10/350 impulse waveform without the bimetallic fuse link or element 240 deforming to open the circuit.

As discussed above, when the voltage-switching/limiting component 291 (e.g., varistor or GDT) of the OPC 290 fails with a relatively small SPD leakage current (i.e., an ambient leakage current event associated with a varistor 291), the fuse assembly 200 is supplied with the SPD leakage current. However, the fuse element 240 is capable of conducting this SPD leakage current for a minimum leakage current time threshold without disintegrating or deforming the fuse element 240 to open the circuit. The fuse assembly 200 remains in the configuration shown in FIG. 10. The fuse assembly 240 therefore will not interrupt the SPD leakage current, and will remain usable for further operation. The voltage-switching/limiting component 291 (e.g., MOV) may further degrade and generate progressively more heat until the thermal disconnector 292 responds to the heat by opening and interrupting the current through the circuit 281. This leakage current is lower than the SPD short circuit trigger current for the bimetallic fuse assembly 200. The leakage current in a power line application may be in a range from about 1 A-15 A. When the leakage current from the varistor is excessive it may cause heat buildup resulting in the thermal disconnector 292 opening the circuit to terminate the leakage current. The minimum leakage current time threshold may be set to be greater than a time at which the thermal disconnector 292 would open the circuit to terminate the leakage current.

As discussed above, the voltage-switching/limiting component 291 (e.g., varistor or GDT) of the OPC 290 may fail as a short circuit in a manner and under circumstances that cause the OPC 290 to supply the fuse assembly 200 with a relatively high SPD short circuit current (e.g., in the range of from about hundreds of amps to tens of kA). This may occur when a varistor 291 of the OPC 290 degrades, for example and acts as a short circuit.

The bimetallic fuse assembly 200 is configured to open based on the minimum short circuit current that the SPD is expected to deliver when the SPD fails as a short circuit, which is based on the application. The minimum expected short circuit current may be called a threshold short circuit current or a trigger current of the bimetallic fuse assembly 200 (i.e., the prescribed trigger current threshold for which the fuse assembly 200 is rated or designed). In a power line application, for example, the minimum expected short circuit current or trigger current may be in a range of 300 A-1000 A.

Figure 11:
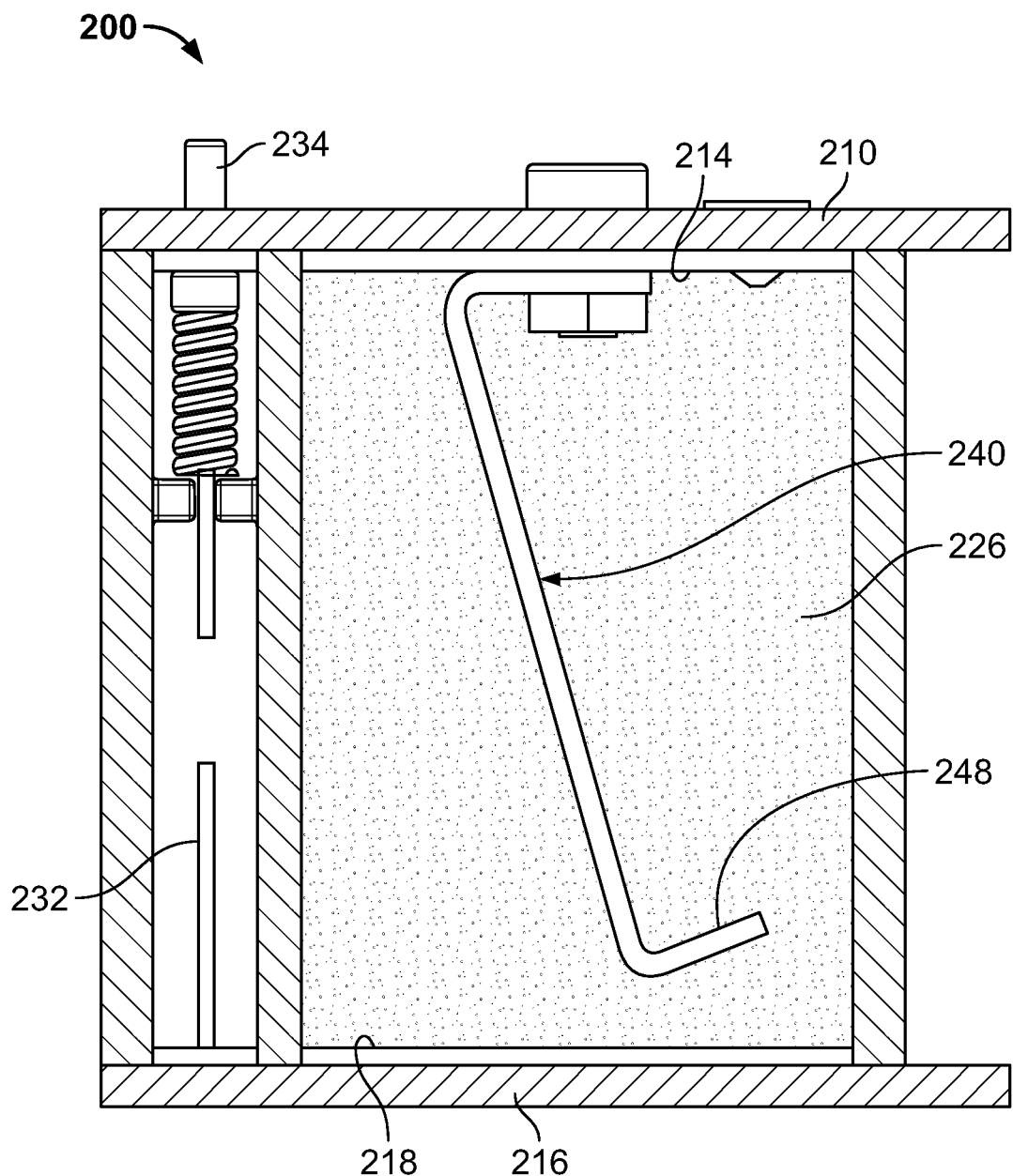
FIGS. 11 and 12 are cross-sectional views of the bimetallic fuse assembly of FIG. 3 taken along the line 10-10 of FIG. 5 and illustrating operation of the bimetallic fuse assembly.

In response to the SPD short circuit current exceeding the prescribed trigger current of the fuse assembly 200, the fuse element 240 will disconnect from the electrode 216 and interrupt the current through the fuse assembly 200. More particularly, the trigger current heats the bimetallic fuse element 240. In response, the differentially expanding layers 250 and 252 cause the second end 242B and the tab 248 of the fuse element 240 to bend or deflect away from the second electrode 216 in the direction B (as shown in FIG. 11). In this manner, the fuse element 240 draws the tab 248 (and thereby the fuse element 240) out of electrical contact with the electrode 216. The granulated extinguishing agent 226 is flowable and permits the fuse element 240 to deform in this manner.

Thus, for a power line application, the bimetallic fuse assembly 200 may be configured such that the bimetallic fuse element 240 deforms once the SPD short circuit current or trigger current has flowed through the fuse for not greater than a maximum short circuit response time threshold. In power line applications, this maximum short circuit response time threshold may be set by regulation or standard to 5 seconds.

Once the fuse element end 242B has been displaced from the electrode 216, electrical arcing will occur between the end 242B and the electrode 216. This arcing causes a portion of the fuse element end 242B to quickly evaporate or disintegrate. The fuse element 242B is thereby shortened or truncated so that it terminates at an end 242C (FIG. 12).

The extinguishing agent 226 (e.g. SiO2), the loss of material from the fuse element 240, and/or the spatial distance between the end of the fuse element 240 will then cause the electrical arcing to terminate, cease or be extinguished. The fuse assembly 200 is now open and the current therethrough has been interrupted.

In some embodiments, the fuse assembly 200 is thereby irreversibly and permanently tripped to an open, current interrupting state. That is, the triggered and tripped fuse assembly 200 is non-resetting and non-resettable.

Figure 12:
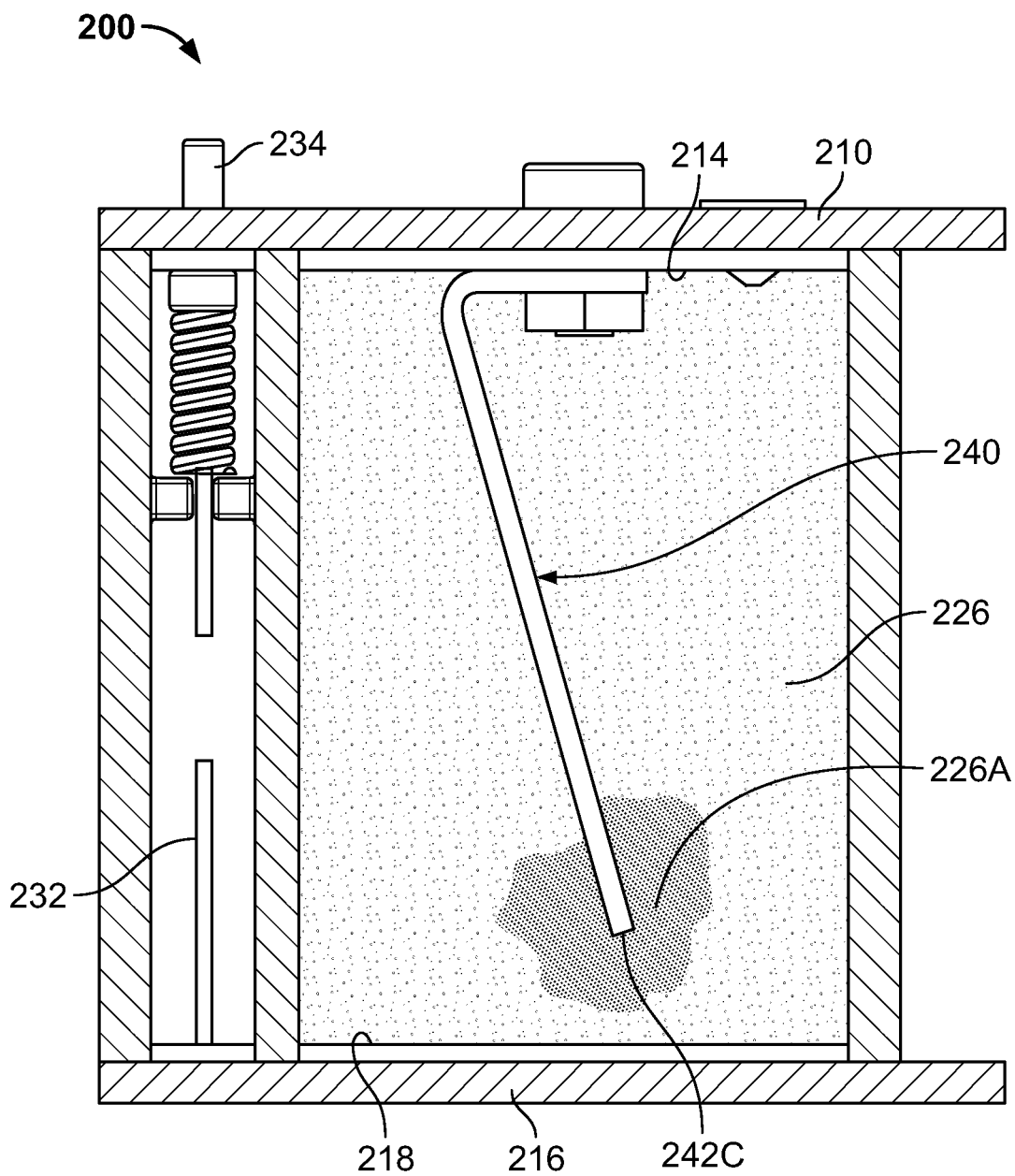

In some embodiments, this non-resetting and non-resettable feature is achieved in whole or in part by the disintegration of the end 242B of the fuse element 200, as illustrated in FIG. 12, for example. The loss of material from the end 242B ensures that the fuse element 240 can no longer make contact with the electrode 216 or come within sufficient proximity to the electrode 216 to enable arcing.

In some embodiments, this non-resetting and non-resettable feature is achieved in whole or in part by interference from the extinguishing agent 226. In some embodiments, the arcing described above also causes a portion 226A of the extinguishing agent 226 adjacent the fuse element 240 to fuse or otherwise harden or lose flowability, as illustrated in FIG. 12, for example. When the fuse element 240 cools (after cessation of the trigger current), the bimetallic fuse element 240 may tend to unbend (i.e., return to its original shape). The stiffened or rigidified extinguishing agent 226 prevents or inhibits the fuse element 240 from unbending back to a position in which the fuse element 240 would make contact with the electrode 216 or come within sufficient proximity to the electrode 216 to enable arcing.

The indicator mechanism 230 is configured such that the trigger current also disintegrates the resistive wire 232. This permits the indicator pin 234 to pop up through the opening 212C and alert an operator that the fuse assembly 200 has been tripped.

Figure 13:
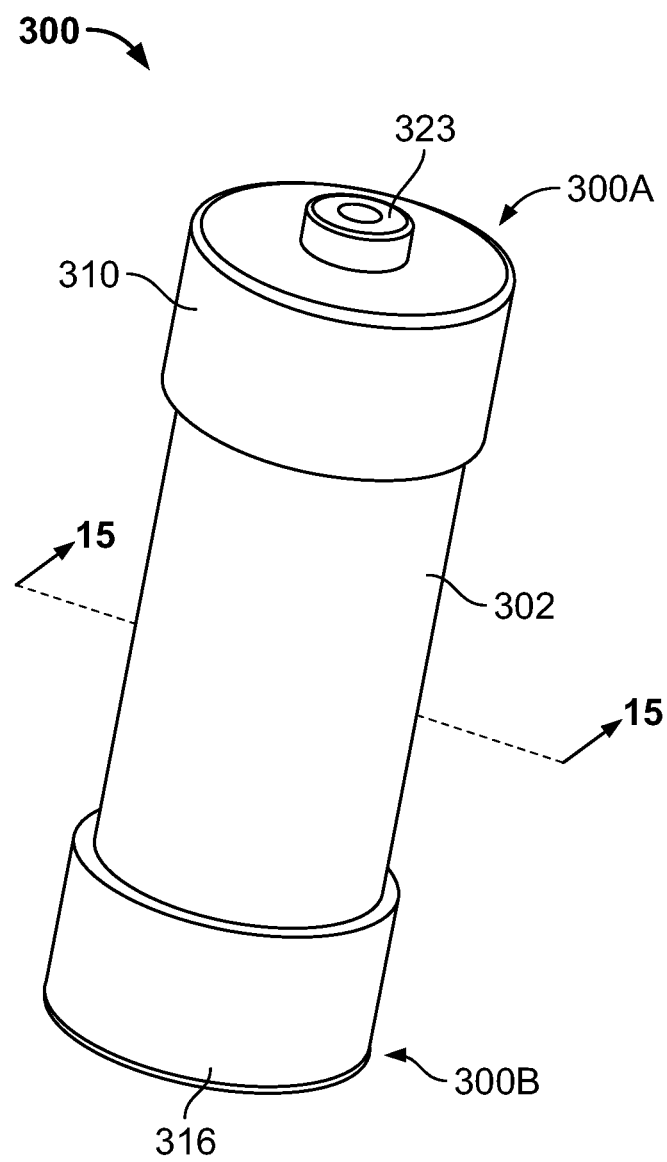
FIG. 13 is a perspective view of a bimetallic fuse assembly according to further embodiments.
Figure 14:
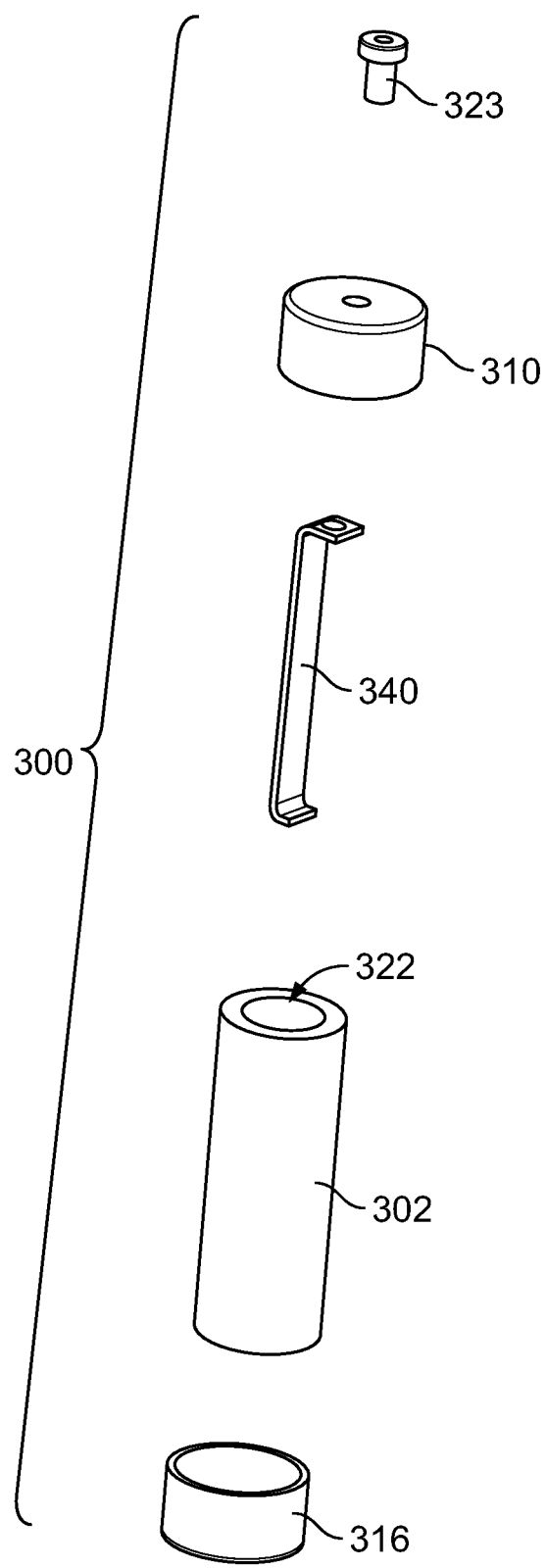
FIG. 14 is an exploded, perspective view of the bimetallic fuse assembly of FIG. 13.
Figure 15:
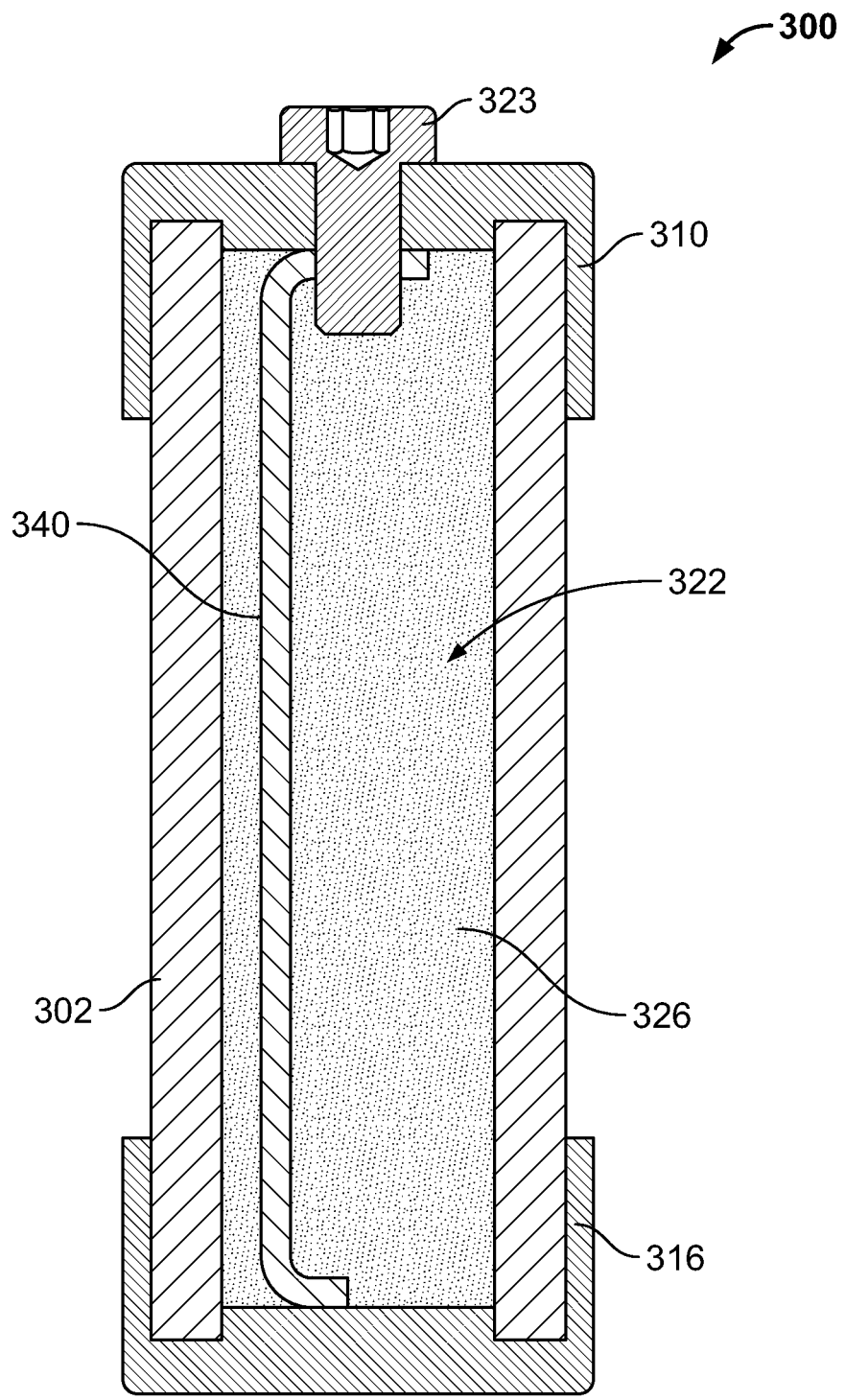
FIG. 15 is a cross-sectional view of the bimetallic fuse assembly of FIG. 13 taken along the line 15-15 of FIG. 13.

In other embodiments, the fuse assembly may have a different form factor. Also, the indicator mechanism may be omitted. For example, FIGS. 13-15 show an exemplary fuse assembly 300 according to further embodiments wherein the fuse housing is cylindrical and no indicator mechanism is provided. The fuse assembly 300 has a first end 300A and an opposing second end 300B. The fuse assembly 300 includes a fuse assembly housing 302, a first electrode 310 (at the end 300A), a second electrode 316 (at the end 300B), a fastener 323, an electric arc extinguishing agent 326, a bimetallic fuse link or element 340, and a main chamber 322 corresponding to the housing 202, the first electrode 210, the second electrode 216, the fastener 223, the electric arc extinguishing agent 226, the bimetallic fuse element 240, and the main chamber 222, respectively.

Figure 16:
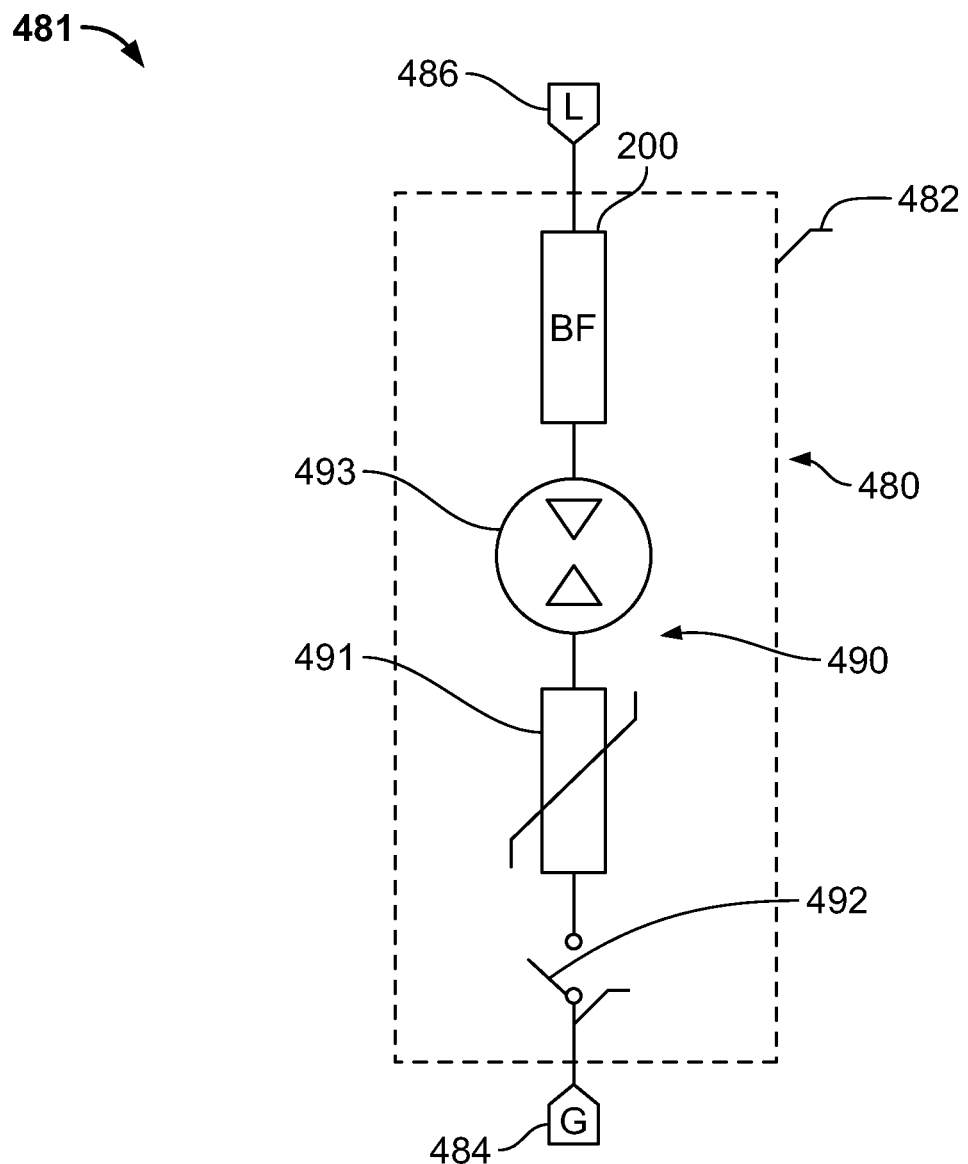
FIG. 16 is a block diagram of a fused SPD circuit and module including a bimetallic fuse assembly in accordance with further embodiments of the inventive concept.
Figure 17:
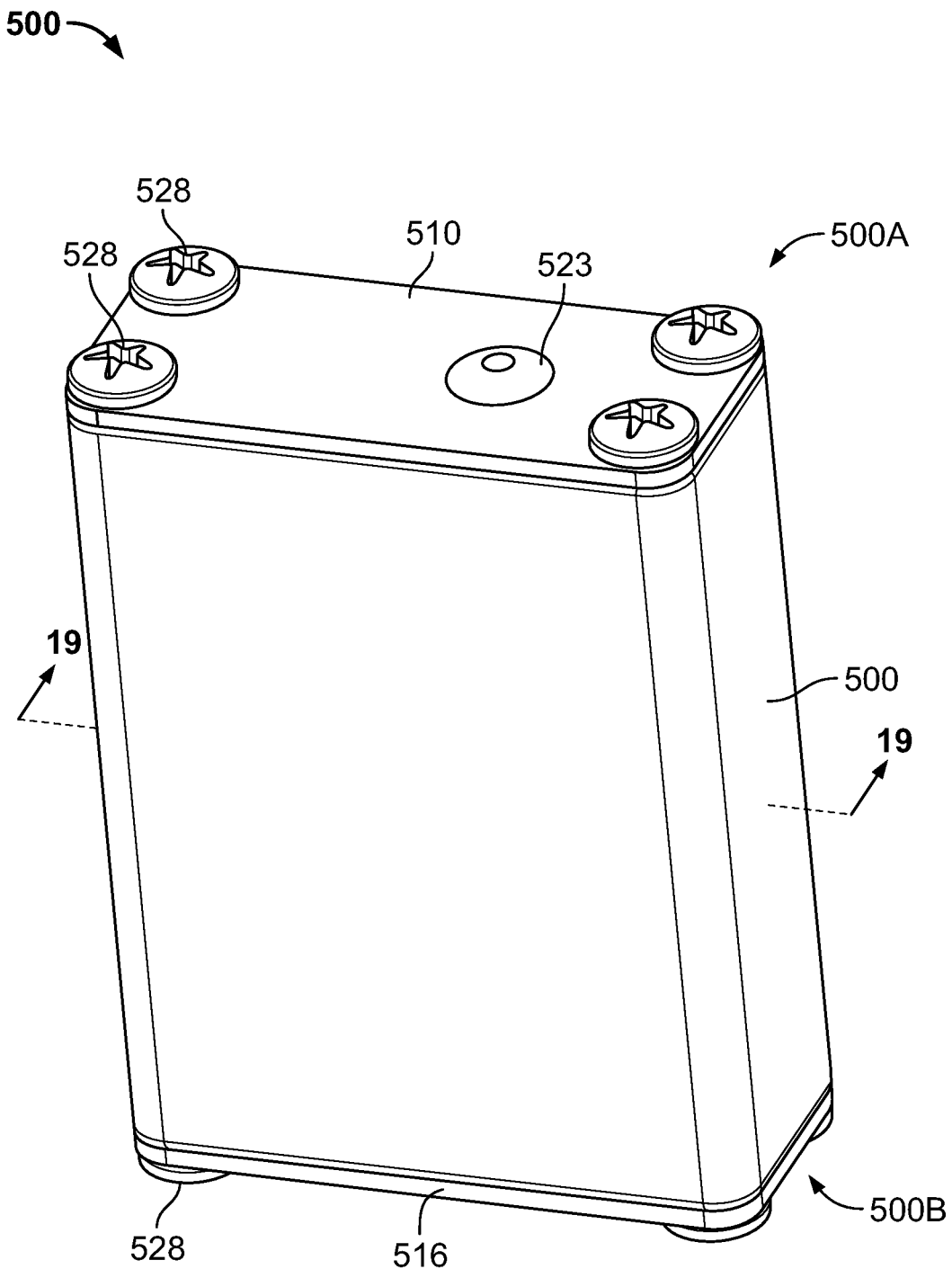
FIG. 17 is a perspective view of a bimetallic fuse assembly according to further embodiments.
Figure 18:
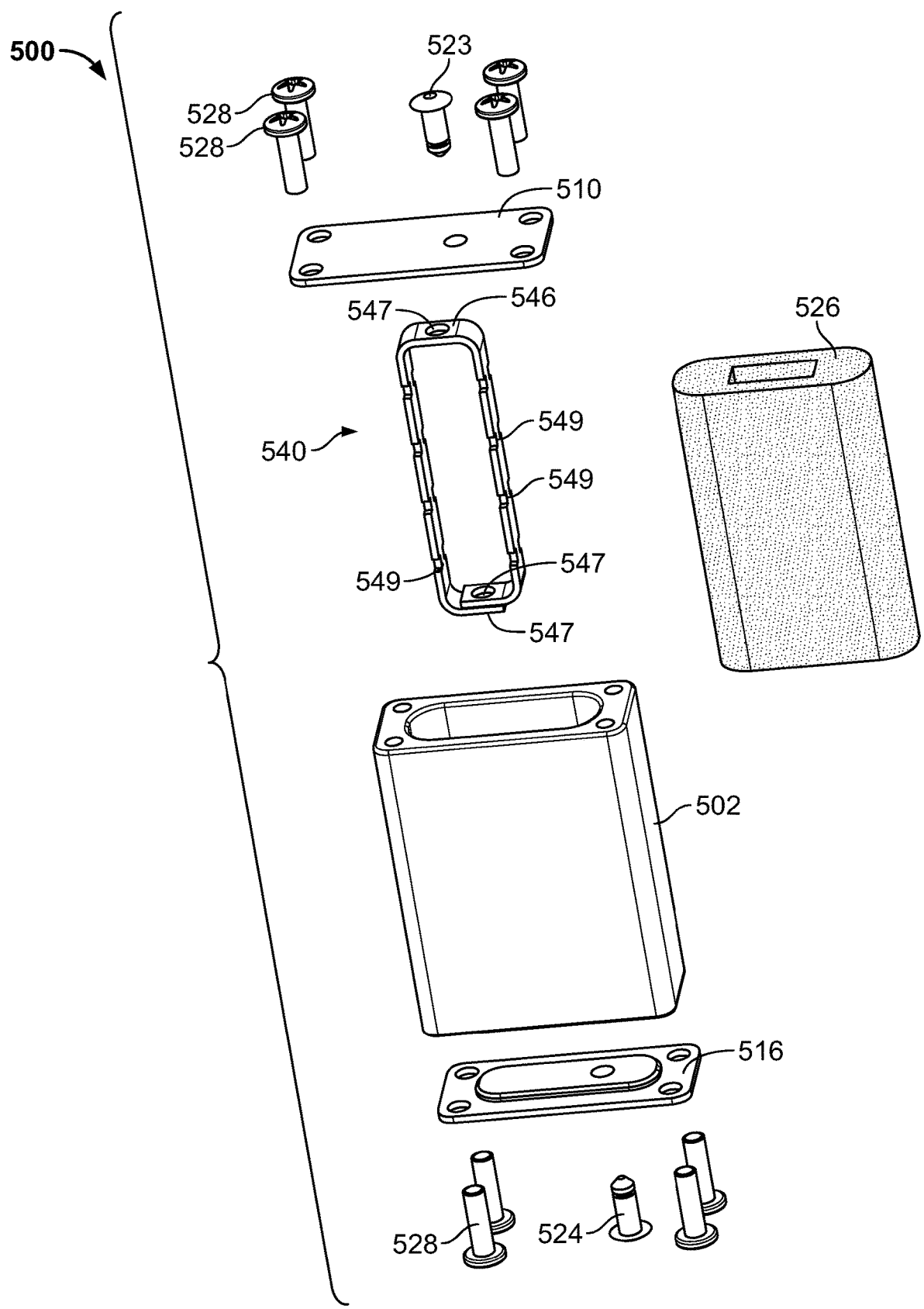
FIG. 18 is an exploded, perspective view of the bimetallic fuse assembly of FIG. 17.
Figure 19:
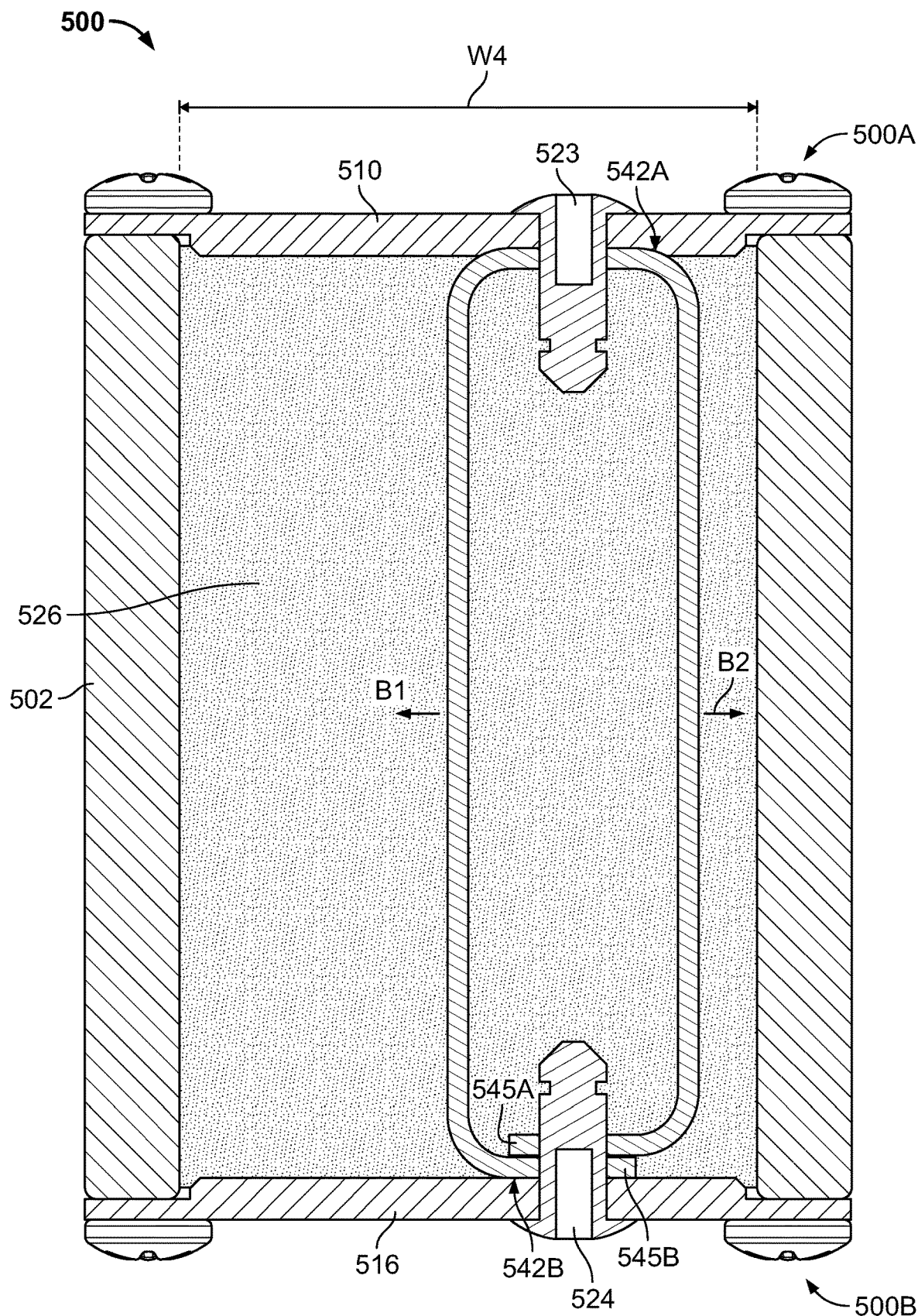
FIG. 19 is a cross-sectional view of the bimetallic fuse assembly of FIG. 17 taken along the line 19-19 of FIG. 17.
Figure 20:
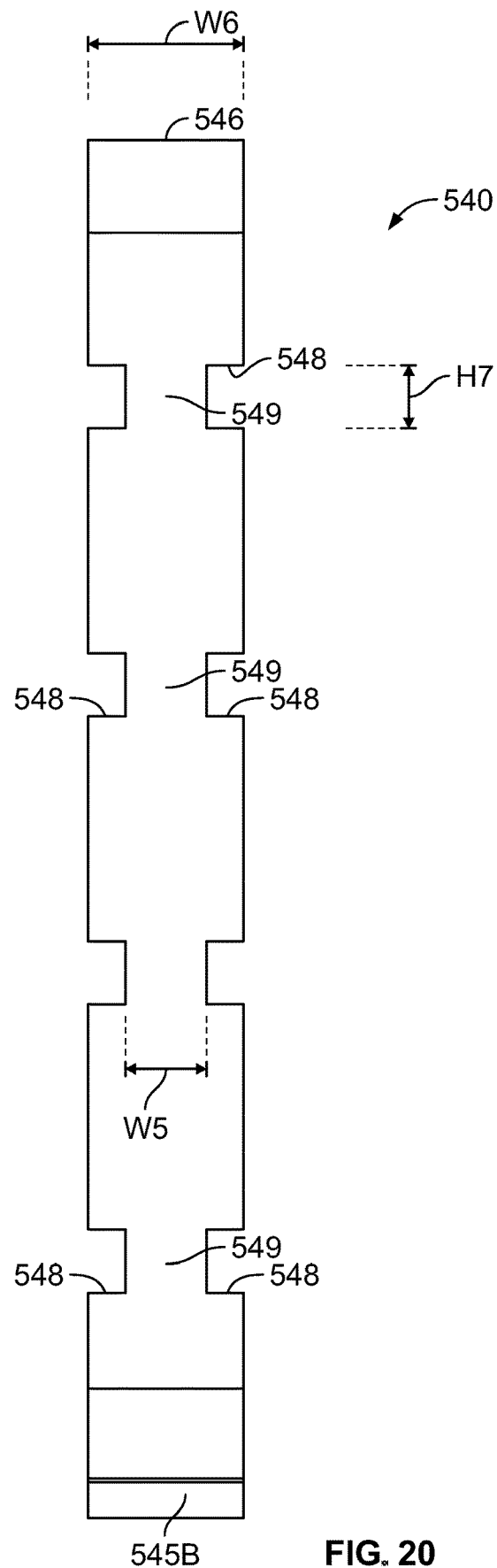
FIG. 20 is a right side view of a bimetallic fuse element forming a part of the bimetallic fuse assembly of FIG. 17.

Referring to FIG. 16, a fused SPD circuit 481, and a fused SPD module 480 forming the circuit 481, according to further embodiments of the inventive concept are shown therein. The fused SPD module 480 includes the fuse assembly 200, a module housing 482, a first electrical terminal 484, a second electrical terminal 486, an OPC 490, and a thermal disconnector 492. The fused SPD circuit 481 and fused SPD module 480 may be constructed and operate as described for the circuit 281 and module 280, except as follows.

The OPC 490 includes both a varistor (e.g., MOV) 491 and a GDT 493. The varistor 491 and the GDT 493 are provided in electrical series with the fuse assembly 200 and, in some embodiments, with the thermal disconnector 492.

With reference to FIGS. 17-21, a bimetallic fuse device or assembly 500 according to further embodiments is shown therein. The fuse assembly 500 may be constructed, installed and used in the same manner as described for the fuse assembly 200, except as discussed below. For example, the fuse assembly 500 may be used in place of the fuse assembly 200 in the fused SPD module 280.

The fuse assembly 500 has a first end 500A and an opposing second end 500B. The fuse assembly 500 includes a fuse assembly housing 502, a first electrode 510, a second electrode 516, electrode fasteners 528, fuse element fasteners 523, 524, an electric arc extinguishing agent 526, and a bimetallic fuse link or element 540. The housing 502 and the electrodes 510, 516 define a fuse chamber 522.

The housing 502 may be formed of any suitable electrically insulating material. In some embodiments, the housing 502 is formed of ceramic.

The electrodes 510, 516 may be formed of any suitable electrically conductive metal. In some embodiments, the electrodes 510, 516 are formed of copper, brass, stainless steel, aluminum copper (AlCu) or tungsten copper (WCu). The electrodes 510, 516 may be formed of a base metal as stated above with additional surface plating (galvanization) of nickel or tin.

The electric arc extinguishing agent 526 may be formed of any suitable material. In some embodiments, the arc extinguishing agent 526 is a material as described for the extinguishing agent 226 (e.g., a flowable media, such as silica granules). The fuse chamber 522 is filled with the agent 526.

The fuse element 540 is a bimetallic strip having opposed first and second ends 542A, 542B. The strip includes, an integral first tab or base section 546 on the first end 542A, a first elongate connecting body, section, branch or leg 544, a second elongate connecting body, section, branch or leg 545, and integral tabs 544A, 545A. Each leg 544, 545 extends from a first leg end 543A joined to the base section to an opposing second leg end 543B from which a respective tab 544A, 545A extends at the second end 542B. Mounting holes 547 are defined in the base section 546 and each of the tabs 544A, 545A.

In some embodiments and as shown, the fuse element 540 includes the legs 544, 545, the base section 546 and the tabs 544A, 545A in the form of a unitary (in some embodiments, monolithic) strip. In other embodiments, the fuse element 540 may be configured as two (or more, if more than two legs are provided) bimetallic strips, each including a respective one of the legs.

The base section 546 is secured, anchored or affixed to the first electrode 510 by the fastener 523 extending through the hole 547 therein. In some embodiments, the fastener 523 is a rivet. The base section 546 may be affixed to the first electrode 510 using other techniques such as a nut and bolt, a screw, or a weld. The base section 546 is thereby held in electrical contact with the interior surface of the electrode 510.

The tabs 544A, 545A are secured, anchored or affixed to the second electrode 516 by the fastener 524 extending through the hole 547 therein. In some embodiments, the fastener 524 is a rivet. The tabs 544A, 545A may be affixed to the second electrode 510 using other techniques such as a nut and bolt, a screw, or a weld). The tabs 544A, 545A are thereby held in electrical contact with the interior surface of the electrode 516.

The fuse element 540 is generally surrounded by the agent 526 that fills the main chamber 522.

The bimetallic fuse element 540 includes a first or inner metal band or layer 550 (FIG. 21) and a second or outer metal band or layer 552 mated (e.g., face to face) with the inner metal layer 550 along the length of the fuse element 540 (including along the lengths of the legs 544, 545). The inner metal layer 550 and the outer metal layer 552 are formed of different metal compositions from one another.

In some embodiments, the inner metal layer 550 is formed of a metal having a higher coefficient of thermal expansion than that of the outer metal layer 552. In this case, when the fuse element 540 is heated, the different rates of thermal expansion between the metal layers 550, 552 will cause the leg 544 to bend or deform in a deformation direction B1 and/or will cause the leg 545 to bend or deform in a deformation direction B2. Alternatively, the outer metal layer 552 may be formed of a metal having a higher efficient of thermal expansion than that of the inner metal layer 550, so that the legs 544 and 545 bend or deform in directions opposite the directions B1 and B2, respectively, when the fuse element 540 is heated.

The metal layers 550, 552 may be formed of metals as described herein for the metal layers 250, 252.

The legs 544, 545 each include a plurality of preformed weak points 549 therein. The weak points 549 may be formed by cutouts 548 defined in the legs 544, 545. In some embodiments (e.g., as shown in the drawings), the cutouts 548 are defined in the side edges of the legs 544, 545.

In some embodiments, there are at least three weak points 549 defined in each leg 544, 545. In some embodiments, the number of weak points 549 defined in each leg 544, 545 is in the range of from 3 to 10. In other embodiments, there may be as few as one weak point 549 defined in each leg 544, 545. The cutouts 548 reduce the widths of the legs 544, 545 at the locations of the weak points 549 along the lengths of the legs 544, 545.

In some embodiments, the width W3 (FIG. 21) of the fuse element 540 is in the range of from about ⅓ to ⅔ of the width W4 (FIG. 19) of the chamber 522.

In some embodiments, the width W5 (FIG. 20) of each leg 544, 545 at the weak points 549 is in the range of from about ⅔ to ¼ of the width W6 (FIG. 20) of each leg 544, 545.

In some embodiments, the height H7 (FIG. 20) of each cutout 548 is in the range of from about ⅔ to ¼ of the width W6 of each leg 544, 545.

In some embodiments, the fuse element 540 has a specific resistance in the range of $1 \times 10^{-8}$ to $1 \times 10^{-6}$ Ωm.

The fuse assembly 500 and the fuse element 540 can be used in the same manner as described herein for the fuse assembly 200 and the fuse element 240. However, instead of bending out of contact with the electrode 516 as described for the fuse element 240, the legs 544, 545 disintegrate or break apart at a weak point 549 in a midsection of each leg 544, 545. Once a leg 544, 545 has broken, electrical arcing will occur between the opposed ends of the leg 544, 545 at the break. This arcing causes a portion or portions of the fuse element 540 at these opposed ends to quickly evaporate or disintegrate. The extinguishing agent 526 (e.g., SiO2), the loss of material from the fuse element 540, and/or the spatial distance between the opposed ends of the leg 544, 545 at the break will then cause the electrical arcing to terminate, cease or be extinguished. Once both legs 544, 545 have been transformed in this manner, the fuse assembly 500 is open and the current therethrough has been interrupted.

In some embodiments, the fault current will initially generate heat in, arcing at and disintegration of the fuse element 540 at one of the weak points 549 in one of the legs 544, 545. The fault current may then cause the fuse element 540 to begin arcing and disintegrating at other weak points 549 in the same leg 544, 545. The current will also then cause the other leg 544, 545 to begin arcing and disintegrating at one or more weak points 549 therein. The disintegration of each leg 544, 545 will propagate along the leg 544, 545 toward the electrodes 510, 516 until the arcing in the leg 544, 545 is terminated by the extinguishing agent 526 and/or spatial distance between the opposed ends of the leg 544, 545. In some cases, most of each leg 544, 545 will be disintegrated, and in some embodiments substantially all of each leg 544, 545 will be disintegrated, depending on the amplitude of the fault current.

In some embodiments, the bimetallic legs 544, 545 will bend or deform (e.g., in directions B1, B2) in response to the heat generated in the legs 544, 545 by the surge current flowing therethrough. This bending or deformation can assist in spacing apart the opposed ends of leg 544, 545 at a break (e.g., occurring at a weak point 549) to extinguish arcing. However, in other embodiments, the electrodes 510, 516 may be fully disconnected by the disintegration of the leg 544, 545 before the leg 544, 545 bends or deforms, or before the extent of the bending or deformation can appreciably contribute to the disconnection.

It will be appreciated that the bimetallic fuse element 540 provides two parallel branches (i.e., the two legs 544, 545) for the flow of current through the fuse assembly 500. In other embodiments, the bimetallic fuse element 540 may include more than two (e.g., three, four, or more) legs corresponding to and secured in the same manner as the legs 544, 545 that each provide a parallel branch for the flow of current through the fuse assembly 500. The provision of two or more branches 544, 545 increases the overall effective cross-sectional area of the fuse element 540. This increased cross-sectional area can serve to increase the surge current rating of the fuse assembly 500.

With reference to FIGS. 22-27, a fused surge protective device (SPD) unit or module 600 according to further embodiments is shown therein. The fused SPD module 600 includes the fuse assembly 500 integrated therein. However, in other embodiments, the fuse assembly 200, the fuse assembly 300, or another bimetallic fuse assembly according to embodiments of the invention may be used in place of the fuse assembly 500 in the fused SPD module 600.

The fused SPD module 600 includes a module housing 610, a first module electrical terminal 622, a second module electrical terminal 626, an overvoltage protection circuit (OPC) assembly 640, a thermal disconnector 650, an indicator mechanism 660, and the fuse assembly 500. The thermal disconnector 650, the OPC assembly 640, and the fuse assembly 500 are disposed in the housing 610, and are electrically connected in series between the module terminals 622 and 626 to form a fused SPD electrical circuit 681. It will be appreciated that the fused SPD electrical circuit 681 corresponds to the fused SPD electrical circuit 281 (FIG. 3). It will be appreciated that the OPC 640, the thermal disconnector 650, the indicator mechanism 660, the fuse assembly 500, and the fused SPD assembly 600 function and operate in the same manner as described herein for the OPC 290, the thermal disconnector 292, the indicator mechanism 230, the fuse assembly 200, and the fused SPD module 280, except as discussed below.

The module housing 610 includes a module frame 614 and a module cover 612. The components 622, 626, 640, 650, 660, 500 are mounted on or in the module frame 614, and this subassembly is covered by the module cover 612. The module electrical terminals 622, 626 project from the base of the housing 610. In use, the fused SPD module 600 can be mounted on a cooperating base assembly such that the module electrical terminals 622, 626 make mechanical and electrical contact with associated terminals of the base assembly.

The OPC assembly 640 includes an overvoltage protection circuit 690. In some embodiments, the OPC assembly 640 is a multi-cell GDT assembly. In some embodiments, the OPC assembly 640 is a multi-cell GDT assembly as disclosed in U.S. Pat. No. 10,685,805 to Rozman or U.S. Pat. No. 10,186,842 to Rozman, the disclosures of which are incorporated herein by reference. However, it will be appreciated that other types and configurations of overvoltage protection circuits and active voltage-switching/limiting components may be used in or in place of the multi-cell GDT 640.

The illustrative multi-cell GDT assembly 640 includes a primary GDT 646A and a secondary multi-cell GDT 646B. The multi-cell GDT assembly 640 has a first terminal 642 and a second terminal 644. The primary GDT 646A and the secondary multi-cell GDT 646B are connected in electrical series between the terminals 642, 644, for example, as disclosed in U.S. Pat. No. 10,685,805.

The fused SPD module 600 includes a first terminal member 620 including the first module terminal 622 and electrically connecting the first module terminal 622 to the terminal 642.

The fused SPD module 600 includes a second terminal member 624 including the second module terminal 626 and electrically connecting the second electrode 516 of the fuse assembly 500 to the second module terminal 626.

The terminal 644 of the multi-cell GDT 640 is electrically connected to the first electrode 510 of the fuse assembly 500 by the thermal disconnector 650, which is electrically conductive (e.g., metal). More particularly, a first end 650A of the thermal disconnector 650 is fastened to the fuse electrode member 510. An opposing end 650B of the thermal disconnector 650 is affixed to the terminal 644 by a meltable bonding agent 655 such as a solder.

A leg or spring contact 652 is retained by the bonding agent 655 in an elastically deflected position such that the spring force of the spring contact 652 tends to pull the end 650B away from the terminal 644. In use, when the GDT assembly 640 fails (e.g., the multi-cell secondary GDT 646B short-circuits internally), the primary GDT 646A will quickly heat up until the solder 655 melts sufficiently to release the spring contact 652, which is spring biased or loaded away from the terminal 644. The GDT assembly 640 is thereby disconnected from the fuse assembly 500.

The indicator mechanism 660 includes an indicator member 662, a preload spring 664, a resistive wire 670, a ferrule 672, a resistor 674, an indicator strip 676, an electrical connector member 678, a local indicator window 668 (defined in the cover 612), and a remote indicator opening 667 (defined in the base of the frame 614).

Figure 26:
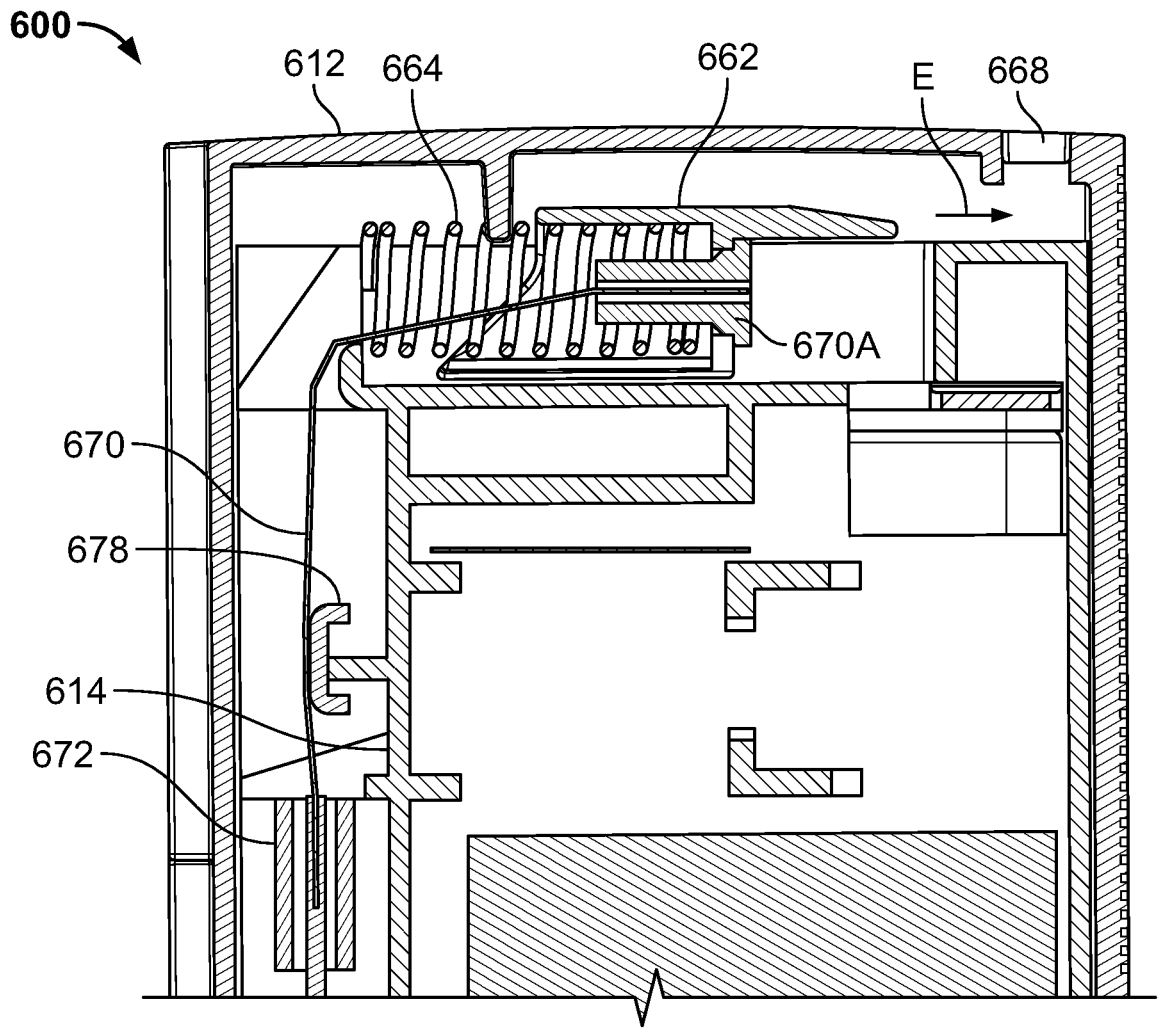
FIG. 26 is a fragmentary, cross-sectional view of the fused SPD module of FIG. 22 taken along the line 26-26 of FIG. 22.

The resistive wire 670 may be constructed as described for the resistive wire 232. A retention cap 670A is affixed to the upper end of the resistive wire 670 and interlocked with the indicator member 662. In the ready (non-failed) configuration, the resistive wire 670 is in tension and retains the indicator member 662 in a ready position against the load of the spring. When the resistive wire 670 disintegrates and breaks (as discussed herein), the indicator member 662 is thereby released to translate in direction E (FIG. 26).

The resistive wire 670 is mechanically braced in tension, and electrically connected to the resistor 674, by the ferrule 672. The opposing lead of the resistor 674 is electrically connected to the second module terminal 626 by an integral connection feature or tab 628 of the second terminal member 624.

The electrical connector member 678 (e.g., formed of metal) electrically connects the resistive wire 670 to the terminal 644 of the GDT assembly 640. An electrical insulator 657 may be provided to increase the breakdown voltage between the electrical connector member 678 and portions of the GDT assembly 640 at a different potential than the terminal 644. It will be appreciated that the resistive wire 670 is connected between the GDT assembly 640 and the second module terminal 626 in electrical parallel with the bimetallic fuse element 540 (FIG. 19) of the fuse assembly 500. The resistor 674 limits current flow through the resistive wire 670.

The fused SPD circuit 681 and fused SPD module 600 operate as described for the circuit 481 and module 480, except that the indicator mechanism 660 will be triggered or actuated under the same conditions as discussed herein for the indicator mechanism 230.

The indicator mechanism 660 is configured such that, under conditions where the trigger current through the fuse assembly 500 opens (i.e., the bimetallic fuse element 540 disintegrates), the trigger current also disintegrates the resistive wire 670. The indicator member 662 is thereby released to translate in direction E under the force of the spring 664. This movement of the indicator member 662 causes the indicator member 662 to move to a position underneath the window 668, thereby providing a local visible alert to a user that the module 600 has failed or tripped.

Figure 27:
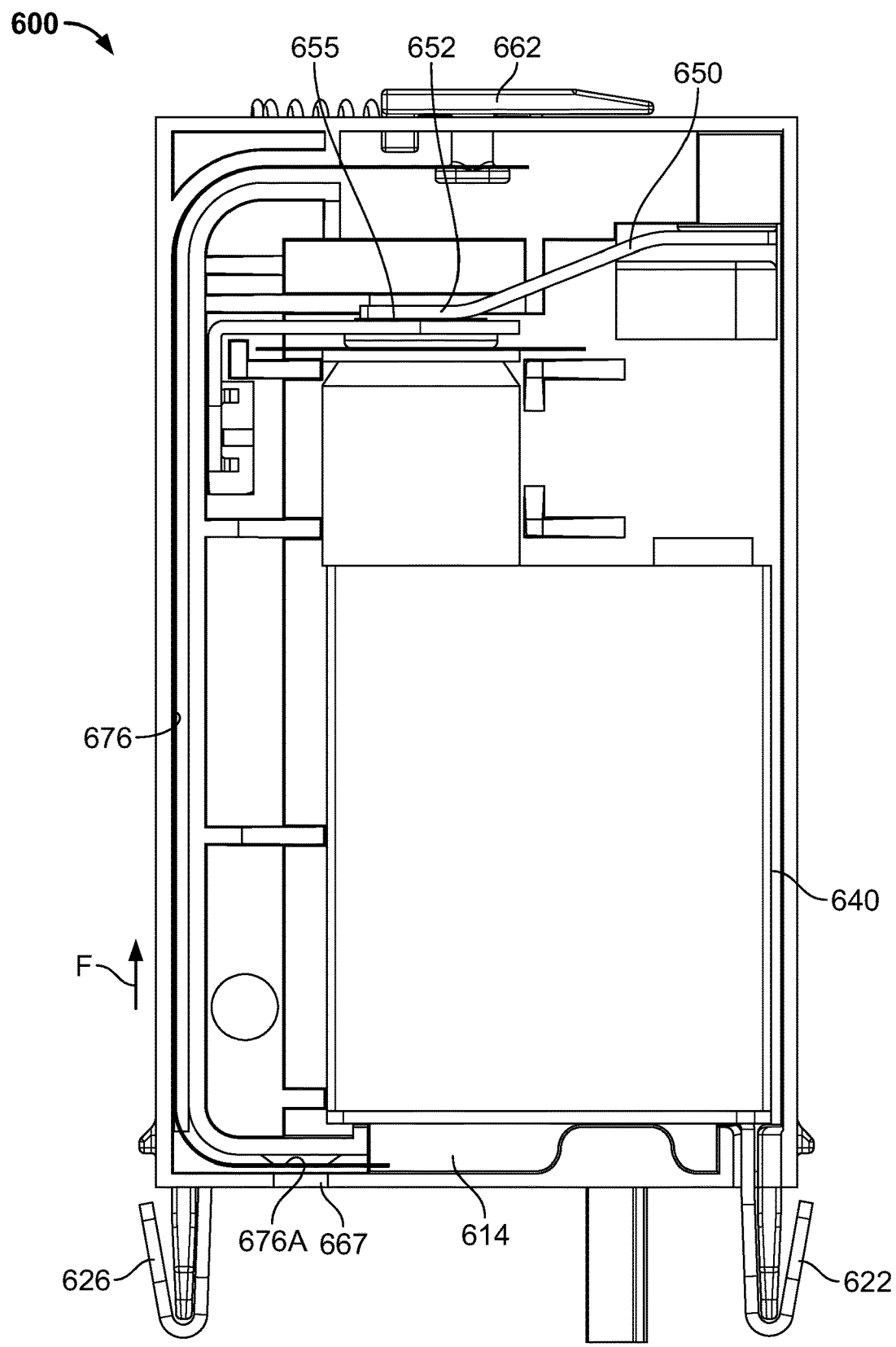
FIG. 27 is a cross-sectional view of the fused SPD module of FIG. 22 taken along the line 27-27 of FIG. 22, wherein the cover is not shown.

This movement of the released indicator member 662 also draws the indicator strip 676 up through a channel 616 in the module frame 614 in direction F (FIG. 27). In this way, an end section 676A of the indicator strip 676 is pulled away from a position over the opening 667, thereby uncovering the opening 667. The uncovering of the opening 667 can permit a switch of the base assembly to move into the module 600 through the opening 667. The switch can in turn be connected to a remote monitoring circuit associated with the base assembly. In this manner, the indicator mechanism 660 can provide a remote alert to a user that the module 600 has failed or tripped.

Figure 21:
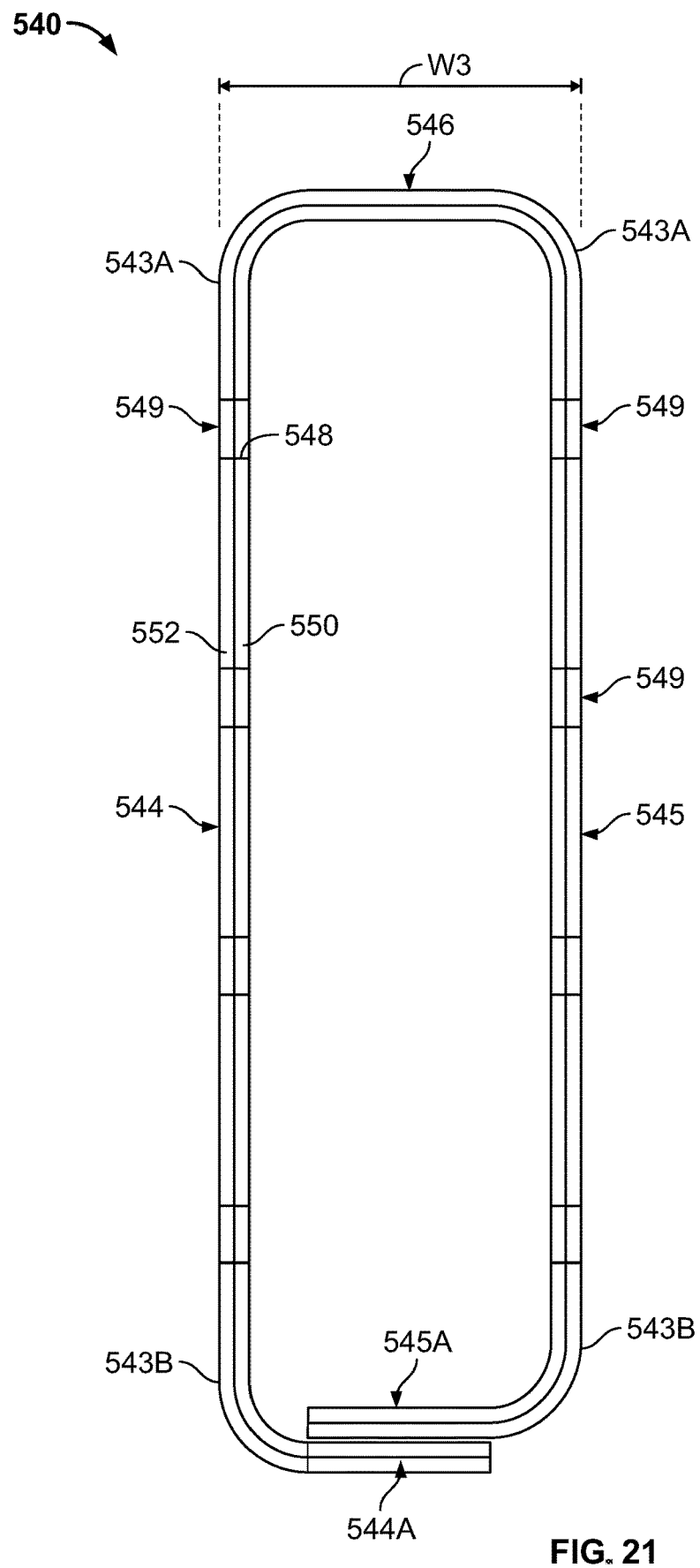
FIG. 21 is a front view the bimetallic fuse element of FIG. 20.
Figure 22:
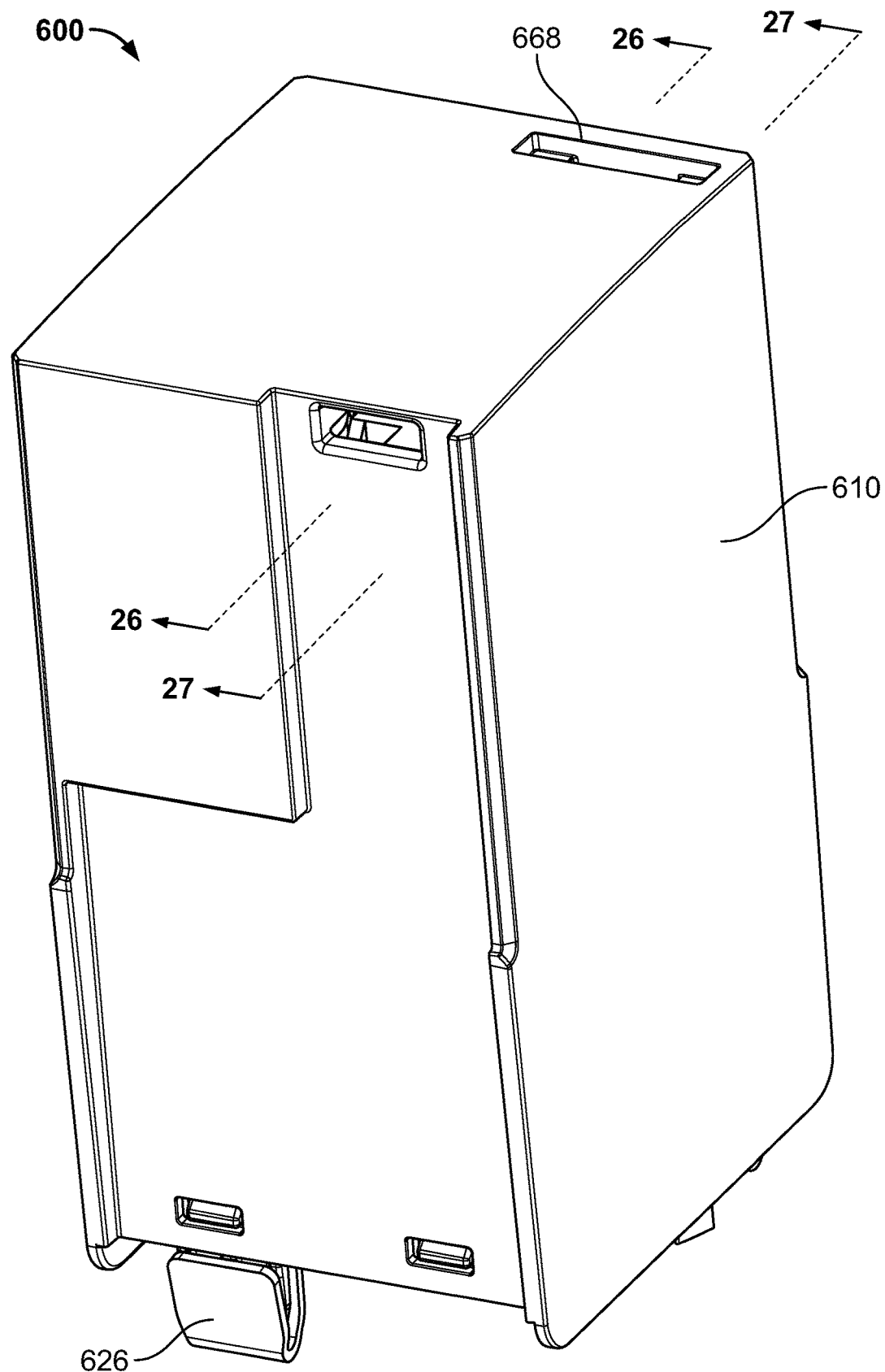
FIG. 22 is a top perspective of a fused SPD module in accordance with further embodiments of the inventive concept.
Figure 23:
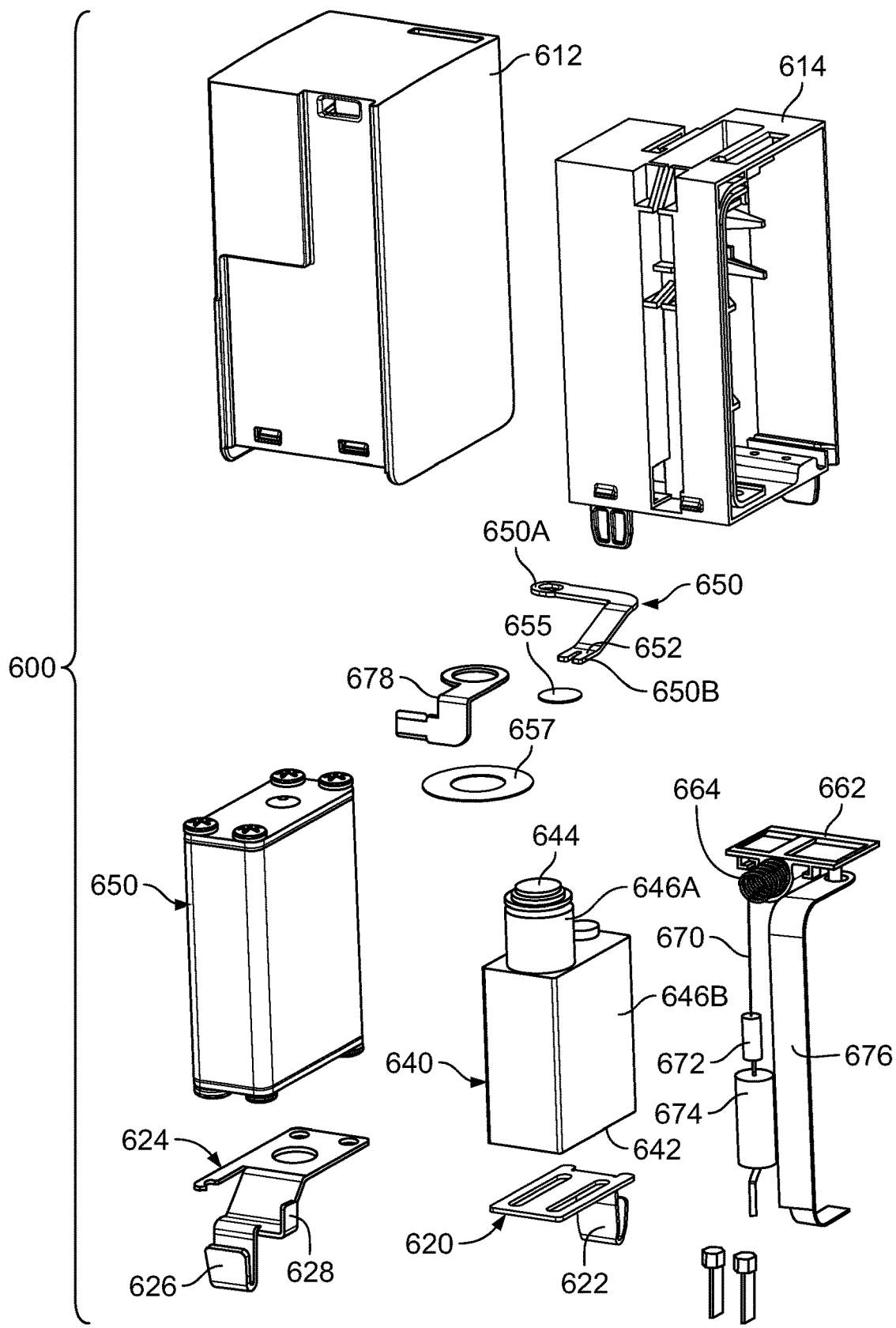
FIG. 23 is an exploded, perspective view of the fused SPD module of FIG. 22.
Figure 24:
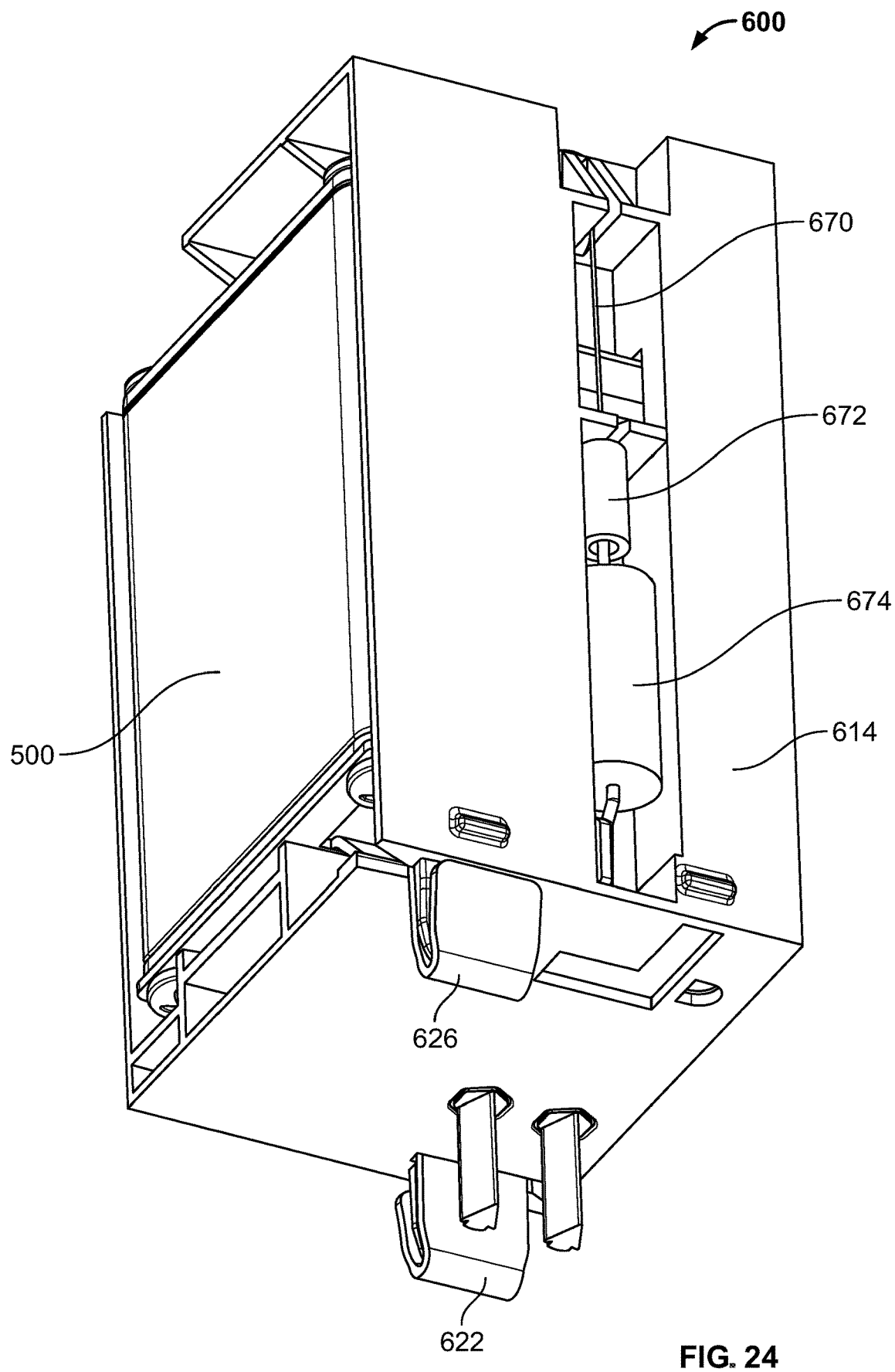
FIG. 24 is a bottom perspective view of the fused SPD module of FIG. 22, wherein a cover of the fused SPD module is not shown.
Figure 25:
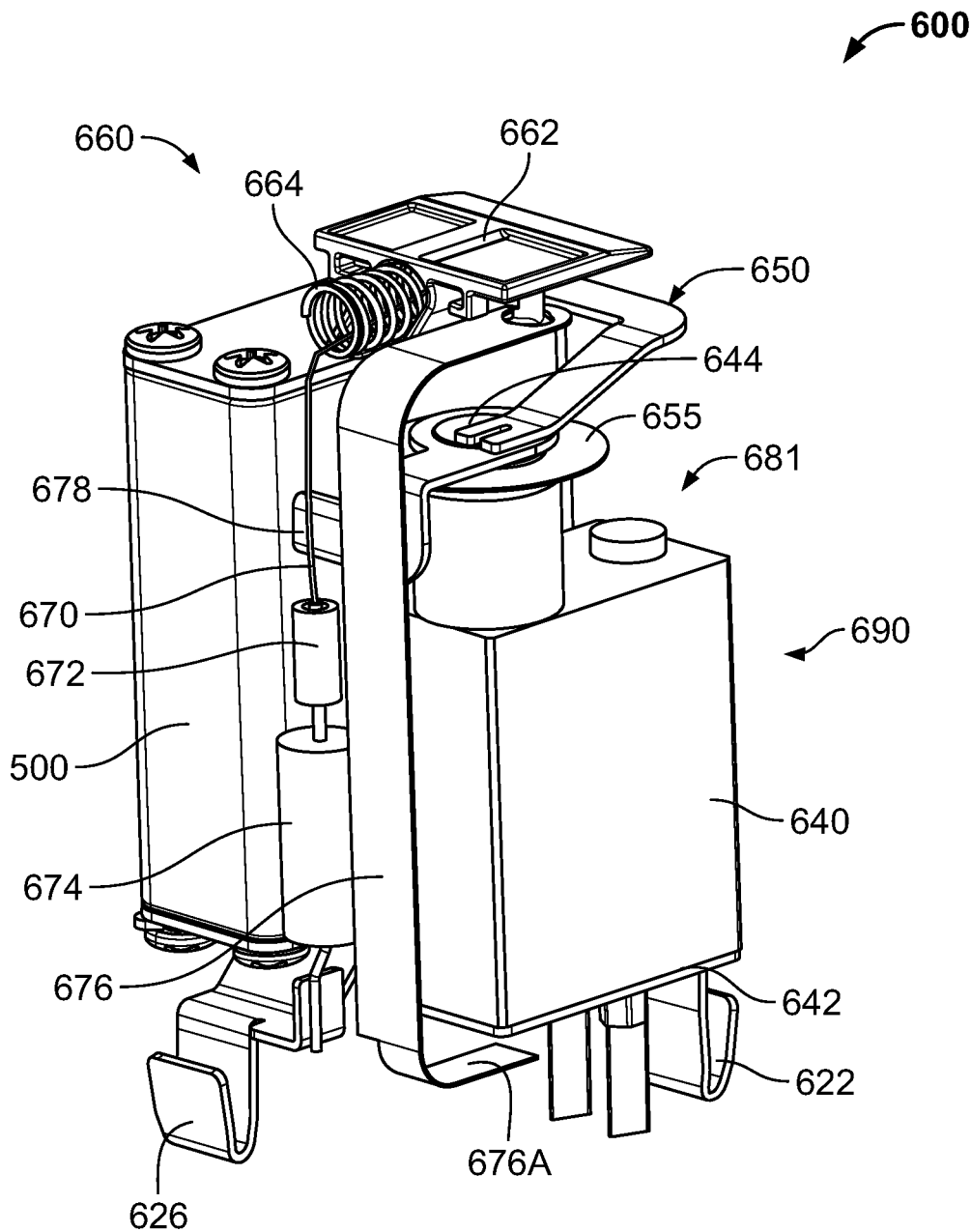
FIG. 25 is a fragmentary, top perspective view of the fused SPD module of FIG. 22, wherein the cover and a frame of the fused SPD module are not shown.

Embodiments of the inventive concept have been described above with respect to the fuse assembly 200 and the fuse assembly 500 including a bimetallic fuse element or link 240 or 540 as shown, for example, in FIGS. 7 and 21. According to some embodiments of the inventive concept, the bimetallic fuse element or link 240 or 540 may comprise one or more fusible elements or legs that each comprise one or more metal alloys. The one or more metal alloys in each element or leg may have a specific resistance in a range of $1 \times 10^{-7}$ Ωm-$5 \times 10^{-7}$ Ωm, which is greater than that of materials used in conventional fuses, such as copper, aluminum, and the like. The shape of each element or leg may be configured to provide the fuse element or link 240, 540 with an overall resistance in the range of 1 mΩ-5 mΩ. Thus, according to some embodiments of the inventive concept, a fuse element 240, 540 comprising a metallic alloy material as described above may be used in a fuse assembly 200, 500, which provides a continuous current conduction of 20 A without overheating above a dT of 60-80K and a surge impulse current rating of 25 kA in response to a 10/350 surge current pulse shape (i.e., a rise time of 10 μs and a decay time to 50% of peak value of 350 μs. The fuse assembly 200 and/or 500 may have an arc voltage associated therewith that is in a range of about 800-900 V in accordance with IEC 60291-1. In other embodiments of the inventive concept, the one or more fusible elements or legs of the fuse element or link 240, 540 need not be bimetallic and instead may comprise a monolithic metal alloy having electrical characteristics as described above. TABLE 1 set forth below provides a summary that compares electrical characteristics of a fuse assembly 200, 500 including a bimetallic/monolithic fuse element 240, 540, according to some embodiments of the inventive concept, with both a conventional small fuse and a conventional big fuse. As can be seen from TABLE 1, the conventional small fuse may have similar specific resistance and overall fuse resistance, but it does not provide a similar impulse surge current rating. Similarly, the large or big fuse may have a similar surge impulse surge current rating, but does not provide a similar specific resistance or overall total resistance.

TABLE 1

| Parameter | Fuse assembly with Bimetallic/Monolithic fuse element | Small fuse - 10 A of continuous current rated | Big fuse - 300 A of continuous current rated |
|---|---|---|---|
| Total resistance | 1-5 mOhm | 20 mOhm | <0.1 mOhm |
| Material type | High. resistive alloy | Alloy (possibly very thin copper) | copper |
| Surge rating 10/350 impulse | 25 kA | 0 | 25 kA |
| Arcing voltage | 800-900 V | ~1000 V | >1500 V |
| Continuous current without overheating dT 60-80K | 20 A | 10 A | 300 A |

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A fused surge protective device (SPD) module, comprising:
  a first electrical terminal;
  a second electrical terminal;
  an overvoltage protection circuit connected between the first electrical terminal and the second electrical terminal; and
  a bimetallic fuse including a bimetallic fuse element connected in series with the overvoltage protection circuit between the first and second electrical terminals;
  wherein the bimetallic fuse element includes:
    a first metal layer having a first coefficient of thermal expansion; and
    a second metal layer having a second coefficient of thermal expansion;
    wherein the first coefficient of thermal expansion is greater than the second coefficient of thermal expansion;
  wherein the bimetallic fuse element is configured to disintegrate in response to a current flowing through the bimetallic fuse element to thereby disconnect the first electrical terminal from the second electrical terminal;
  wherein the bimetallic fuse element is configured to bend in a deformation direction, due to the difference in the coefficients of thermal expansion of the first and second metal layers, in response to heat generated in the bimetallic fuse element by the current flowing through the bimetallic fuse element; and
  wherein said bending assists in extinguishing electrical arcing from the bimetallic fuse element.

2. A protected electrical power supply circuit comprising:
  an overvoltage protection circuit; and
  a bimetallic fuse element connected in electrical series with the overvoltage protection circuit;
  wherein the bimetallic fuse element is configured to disintegrate, and thereby interrupt the protected electrical power supply circuit, in response to a short circuit current flowing through the bimetallic fuse element from the overvoltage protection circuit exceeding a prescribed trigger current of the bimetallic fuse element for at least a prescribed duration;
wherein the bimetallic fuse element includes:
a first metal layer having a first coefficient of thermal expansion; and
a second metal layer having a second coefficient of thermal expansion;
wherein the first coefficient of thermal expansion is greater than the second coefficient of thermal expansion;
wherein the bimetallic fuse element is configured to bend in a deformation direction, due to the difference in the coefficients of thermal expansion of the first and second metal layers, in response to heat generated in the bimetallic fuse element by the short circuit current flowing through the bimetallic fuse element; and
wherein said bending assists in extinguishing electrical arcing from the bimetallic fuse element.

3. The fused SPD module of claim 1 including a module housing, wherein the overvoltage protection circuit and the bimetallic fuse are each mounted in the module housing.

4. The fused SPD module of claim 1 wherein the bimetallic fuse element is configured to disintegrate, and thereby disconnect the first electrical terminal from the second electrical terminal, in response to a short circuit current flowing through the bimetallic fuse element from the overvoltage protection circuit exceeding a prescribed trigger current of the bimetallic fuse element for at least a prescribed duration.

5. The fused SPD module of claim 4 wherein the prescribed trigger current is a minimum expected short circuit current delivered by the overvoltage protection circuit to the bimetallic fuse element when the overvoltage protection circuit has failed as a short circuit.

6. The fused SPD module of claim 1, wherein the bimetallic fuse is configured to carry a current of up to 25kA for a time of up to 5 ms without the bimetallic fuse opening an electrical connection between the first electrical terminal and the second electrical terminal.

7. The fused SPD module of claim 1, wherein the bimetallic fuse is configured to open an electrical connection between the first electrical terminal and the second electrical terminal responsive to carrying a short circuit current from the overvoltage protection circuit for not greater than a maximum short circuit response time threshold.

8. The fused SPD module of claim 7, wherein the short circuit current from the overvoltage protection circuit is in a range of about 300 A- 1000A and the maximum short circuit response time threshold is not greater than 5 seconds.

9. The fused SPD module of claim 1, wherein:
the overvoltage protection circuit comprises a metal oxide varistor (MOV) having a leakage current associated therewith; and
the bimetallic fuse is configured to carry the leakage current without the bimetallic fuse opening an electrical connection between the first electrical terminal and the second electrical terminal.

10. The fused SPD module of claim 9, wherein the leakage current is in a range of about 1A-15A.

11. The fused SPD module of claim 1, wherein the first metal layer comprises FeNi22Cr3 and the second metal layer comprises FeNi36.

12. The fused SPD module of claim 1, wherein:
the overvoltage protection circuit comprises at least one active voltage-switching/limiting component; and
the fused SPD module further includes a thermal disconnector mechanism configured to electrically disconnect the first electrical terminal from the second electrical terminal responsive to heat generated in the at least one active voltage-switching/limiting component.

13. The fused SPD module of claim 1, wherein the overvoltage protection circuit comprises at least one active voltage-switching/limiting component.

14. The fused SPD module of claim 13, wherein the at least one active voltage-switching/limiting component includes a varistor.

15. The fused SPD module of claim 13, wherein the at least one active voltage-switching/limiting component includes a gas discharge tube.

16. The fused SPD module of claim 1 wherein the bimetallic fuse includes an electric arc extinguishing agent surrounding at least a portion of the bimetallic fuse element.

17. The fused SPD module of claim 16 wherein the electric arc extinguishing agent is a flowable media.

18. The fused SPD module of claim 17 wherein the flowable media includes silica granules.

19. The fused SPD module of claim 1, wherein:
the fused SPD module includes first and second electrically conductive electrodes;
the bimetallic fuse element electrically connects the first and second electrodes;
the bimetallic fuse element includes a first end in electrical contact with the first electrode;
the bimetallic fuse element includes a second end in electrical contact with the second electrode;
the second end is not affixed to the second electrode; and
the bimetallic fuse element is configured to deform and thereby displace the second end out of electrical contact with the second electrode in response to a current to thereby disconnect the first electrode from the second electrode.

20. The fused SPD module of claim 19, wherein the first end is affixed to the first electrode.

21. The fused SPD module of claim 1 wherein:
the fused SPD module includes first and second electrically conductive electrodes;
the bimetallic fuse element electrically connects the first and second electrodes;
the bimetallic fuse element includes a first end and an opposing second end;
the first end is affixed to the first electrode; and
the second end is affixed to the second electrode.

22. The fused SPD module of claim 21 wherein the bimetallic fuse element includes at least two branches configured to conduct current in parallel between the first and second electrodes.

23. The fused SPD module of claim 21 wherein:
the bimetallic fuse element includes at least one preformed weak point; and
the bimetallic fuse element is configured to disintegrate at the at least one preformed weak point, and thereby disconnect the first electrode from the second electrode, in response to a current from the overvoltage protection circuit.

24. The protected electrical power supply circuit of claim 2 wherein the prescribed trigger current is a minimum expected short circuit current delivered by the overvoltage protection circuit to the bimetallic fuse element when the overvoltage protection circuit has failed as a short circuit.

25. The protected electrical power supply circuit of claim 2, wherein the overvoltage protection circuit comprises an active voltage-switching/limiting component.

26. The fused SPD module of claim 1, wherein the bimetallic fuse is configured such that at least a portion of the bimetallic fuse element is evaporated by electrical arcing after said bending of the bimetallic fuse element.

27. The protected electrical power supply circuit of claim 2, wherein the bimetallic fuse is configured such that at least a portion of the bimetallic fuse element is evaporated by electrical arcing after said bending of the bimetallic fuse element.

28. The protected electrical power supply circuit of claim 2, wherein:
- the overvoltage protection circuit comprises at least one active voltage-switching/limiting component; and
- the protected electrical power supply circuit further includes a thermal disconnector mechanism configured to electrically disconnect the overvoltage protection circuit responsive to heat generated in the at least one active voltage-switching/limiting component.

* * * * *